United States Patent
Benazzi et al.

(10) Patent No.: US 7,704,378 B2
(45) Date of Patent: Apr. 27, 2010

(54) METHOD FOR THE PRODUCTION OF MIDDLE DISTILLATES BY HYDROISOMERISATION ET HYDROCRACKING OF CHARGES ARISING FROM THE FISCHER-TROPSCH METHOD

(75) Inventors: Eric Benazzi, Chatou (FR); Patrick Euzen, Paris (FR)

(73) Assignees: Institut Francais du Petrole, Rueil Malmaison Cedex (FR); ENI S.p.A., Rome (IT)

( * ) Notice: Subject to any disclaimer, the term of this patent is extended or adjusted under 35 U.S.C. 154(b) by 1272 days.

(21) Appl. No.: 10/543,494

(22) PCT Filed: Jan. 16, 2004

(86) PCT No.: PCT/FR2004/000101
§ 371 (c)(1),
(2), (4) Date: Jul. 27, 2005

(87) PCT Pub. No.: WO2004/076598
PCT Pub. Date: Sep. 10, 2004

(65) Prior Publication Data
US 2006/0144755 A1 Jul. 6, 2006

(30) Foreign Application Priority Data
Jan. 27, 2003 (FR) .................................. 03 00945

(51) Int. Cl.
*C10G 47/10* (2006.01)
*C10G 47/12* (2006.01)

(52) U.S. Cl. ........................... 208/108; 208/59; 208/89; 208/110; 208/111.01; 208/216 PP; 208/950; 502/152

(58) Field of Classification Search ................. 208/110, 208/111.01, 59, 89, 108, 216 PP, 950; 502/152
See application file for complete search history.

(56) References Cited

U.S. PATENT DOCUMENTS

| | | | |
|---|---|---|---|
| 3,843,509 A | 10/1974 | Itoh et al. | |
| 4,497,909 A | 2/1985 | Akitsuki et al. | |
| 4,937,218 A | * 6/1990 | Ramirez de Aqudelo et al. | 502/152 |
| 4,959,338 A | 9/1990 | Miura et al. | |

(Continued)

FOREIGN PATENT DOCUMENTS

EP 0 583 836 A1 * 2/1994

(Continued)

*Primary Examiner*—In Suk Bullock
*Assistant Examiner*—Prem C. Singh
(74) *Attorney, Agent, or Firm*—Millen, White, Zelano & Branigan, P.C.

(57) ABSTRACT

The invention relates to a process for preparing middle distillates from a paraffinic feedstock produced by Fischer-Tropsch synthesis, using a hydrocracking/hydroisomerization catalyst which comprises at least one hydrodehydrogenating element chosen from the group formed by the noble elements of Group VIII of the periodic table, a silica-alumina-based non-zeolitic support obtained from wherein the non-zeolitic silica-alumina based support was obtained from a process comprising starting from a mixture of a partially soluble alumina compound in an acid medium with a totally soluble silica compound or with a totally soluble combination of alumina and hydrated silica, the resultant moldable mixture is concentrated to form a moldable mixture, the resultant mixture is molded and the resultant molded article is subjected to a hydrothermal or thermal treatment.

25 Claims, 4 Drawing Sheets

U.S. PATENT DOCUMENTS

| | | | |
|---|---|---|---|
| 6,071,402 A * | 6/2000 | Danot et al. | 208/112 |
| 6,309,432 B1 * | 10/2001 | Wittenbrink et al. | 44/436 |
| 6,436,870 B1 * | 8/2002 | Iijima et al. | 502/305 |
| 6,551,500 B1 * | 4/2003 | Ishida et al. | 208/111.3 |
| 2004/0065585 A1 | 4/2004 | Benazzi et al. | |

FOREIGN PATENT DOCUMENTS

FR  2818284  6/2002

* cited by examiner

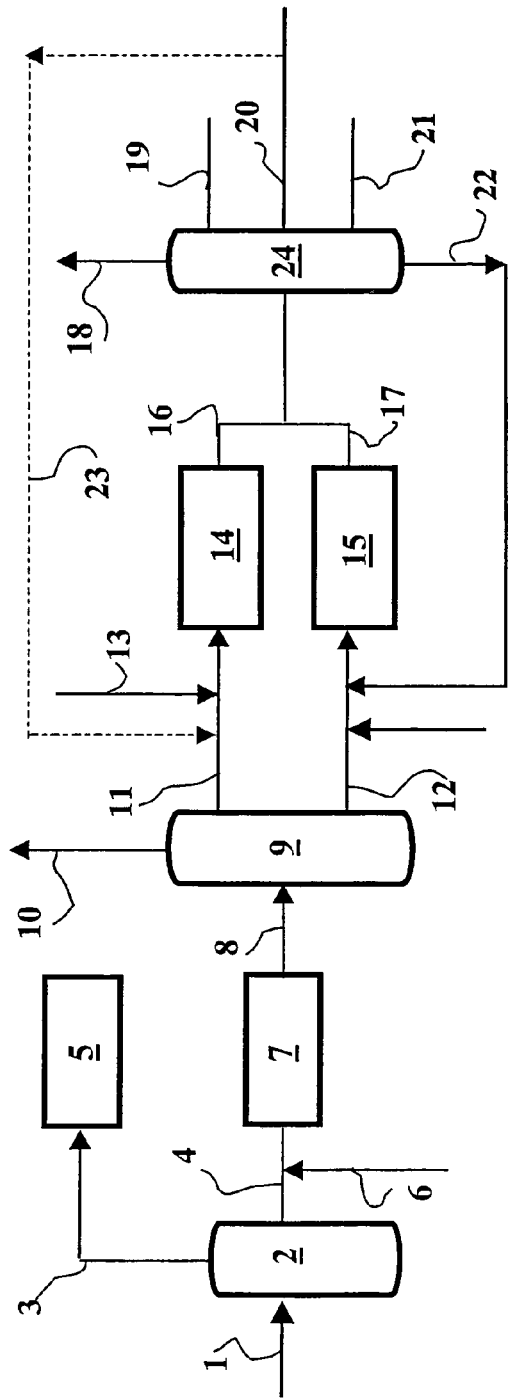
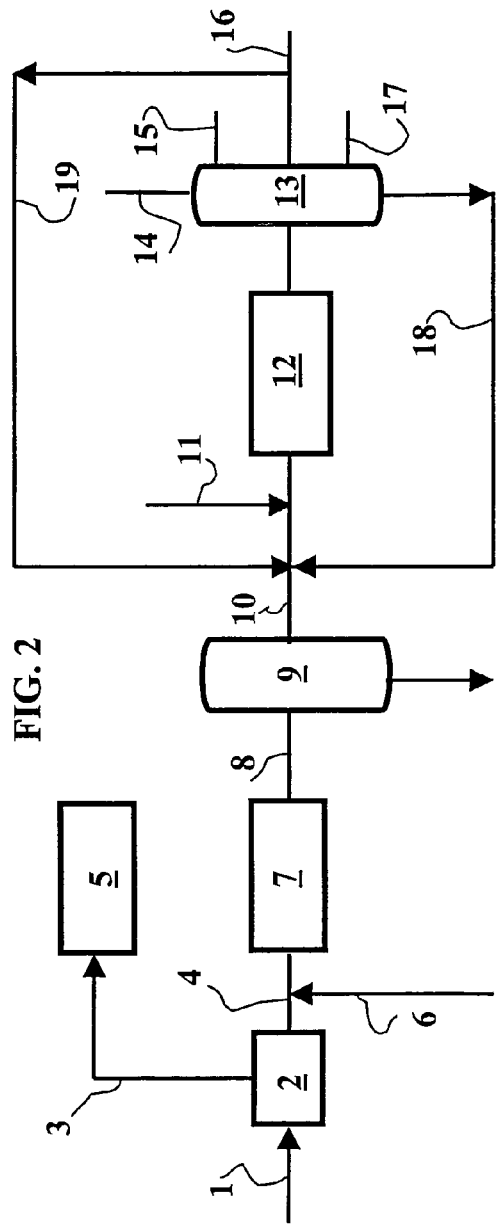
FIG. 1
FIG. 2

METHOD FOR THE PRODUCTION OF MIDDLE DISTILLATES BY HYDROISOMERISATION ET HYDROCRACKING OF CHARGES ARISING FROM THE FISCHER-TROPSCH METHOD

The present invention relates to a process for treatment with hydrocracking and hydroisomerization, of feedstocks resulting from the Fischer-Tropsch process, making it possible to obtain middle distillates (diesel oil, kerosene), utilizing a catalyst comprising a particular silica-alumina.

In the Fischer-Tropsch process, the synthesis gas ($CO+H_2$) is converted catalytically into oxygenated products and essentially linear hydrocarbons in gaseous, liquid or solid form. These products are generally free of heteroatomic impurities, such as, for example, sulphur, nitrogen or metals. They also contain practically few or no aromatics, naphthenes and more generally rings in particular in the case of cobalt catalysts. On the other hand, they can have a non-negligible content of oxygenated products which, expressed by weight of oxygen, is generally approximately 5% by weight and also a content of unsaturated products (olefin products in general) generally less than 10% by weight. However, these products, chiefly constituted by normal paraffins, cannot be used as they are, in particular due to their cold-resistance properties which are not very compatible with the usual uses of the petroleum fractions. For example, the pour point of a linear hydrocarbon containing 20 carbon atoms per molecule (boiling temperature equal to approximately 340° C., i.e. often comprised in the middle distillate fraction) is approximately +37° C., which makes its use impossible, the specification being −15° C. for diesel oil. The hydrocarbons resulting from the Fischer-Tropsch process comprising mostly n-paraffins must be converted to more useable products such as for example diesel oil, kerosene, which are obtained, for example after catalytic hydroisomerization reactions.

The patent EP-583,836 describes a process for the preparation of middle distillates from feedstock obtained by Fischer-Tropsch synthesis. In this process, the feedstock is treated in its entirety, at most the $C_4$ minus fraction can be removed, and the $C_5^+$ fraction boiling close to 100° C. can be obtained. Said feedstock is subjected to a hydrotreatment, then hydroisomerization with a conversion (of products boiling above 370° C. to products with a lower boiling point) of at least 40% by weight. A catalyst which can be used in hydroconversion is a platinum formulation on silica-alumina. The conversions described in the examples are at most 60% by weight.

SUMMARY OF INVENTION

Patent EP-321,303 also describes a process for treatment of said feedstocks with a view to producing middle distillates and optionally oils. In one embodiment, middle distillates are obtained by a process consisting of treating the heavy fraction of the feedstock, i.e. with an initial boiling point comprised between 232° C. and 343° C., by hydroisomerization on a fluorinated catalyst containing a Group VIII metal and alumina, and having particular physico-chemical characteristics. After hydroisomerization, the effluent is distilled and the heavy part is recycled to hydroisomerization. The hydroisomerization conversion of the 370° C.+ products is given as comprised between 50-95% by weight and the examples go up to 85-87%.

All the catalysts currently used in hydroisomerization are of the bifunctional type combining an acid function with a hydrogenating function. The acid function is provided by supports with large surface areas (150 to 800 $m^2.g^{-1}$ generally) having a surface acidity, such as the halogenated aluminas (in particular chlorinated or fluorinated), the phosphorated aluminas, the combinations of boron and aluminium oxides, the amorphous silica-aluminas, and the silica-aluminas. The hydrogenating function is provided either by one or more metals of Group VIII of the periodic table of the elements, such as iron, cobalt, nickel, ruthenium, rhodium, palladium, osmium, indium and platinum, or by a combination of at least one Group VI metal such as chromium, molybdenum and tungsten, and at least one Group VIII metal.

The balance between the two acid and hydrogenating functions is one of the parameters controlling the activity and selectivity of the catalyst. A weak acid function and a strong hydrogenating function produce catalysts which are relatively inactive and selective as regards isomerization, whereas a strong acid function and a weak hydrogenating function produce catalysts which are highly active and selective as regards cracking. A third possibility is to use a strong acid function and a strong hydrogenating function in order to obtain a highly active catalyst which is also highly selective as regards isomerization. It is therefore possible, by judiciously choosing each of the functions, to adjust the activity/selectivity ratio of the catalyst.

The performances of these catalysts are narrowly linked to their physico-chemical characteristics and more particularly to their textural characteristics. Thus, and in general fashion, the presence of macropores in the catalysts comprising a silica-alumina (such as those described for example in U.S. Pat. No. 5,370,788) is a disadvantage. By macropores is meant pores the diameter of which is greater than 500 Å.

Wishing to resolve this problem, the applicant has been led to prepare silica-alumina hydrocracking catalysts with reduced macropore contents and having improved catalytic performances in the processes of hydrocracking and hydroisomerization of paraffins resulting from a Fischer-Tropsch synthesis process.

The present invention therefore relates to a process for preparing middle distillates. This process makes it possible to:

considerably improve the cold properties of the paraffins resulting from the Fischer-Tropsch process and having boiling points corresponding to those of the diesel-fuel and kerosene fractions (also called middle distillates) and in particular to improve the freezing point of the kerosenes.

to increase the quantity of middle distillates available by hydrocracking of the heaviest paraffin compounds, present in the effluent leaving the Fischer-Tropsch unit, and which have boiling points higher than those of the diesel fuel and kerosene fractions, for example the 380° C.+ fraction.

and this process utilizes a particular silica-alumina making it possible to obtain highly selective and active catalysts.

More precisely, the invention relates to a process for preparing middle distillates from a paraffinic feedstock produced by Fischer-Tropsch synthesis utilizing a particular hydrocracking/hydroisomerization catalyst comprising:

at least one hydro-dehydrogenating element chosen from the group formed by the noble elements of Group VIII of the periodic table.

a non-zeolitic silica-alumina-based support containing a quantity greater than 5% by weight and lower than or equal to 95% by weight of silica ($SiO_2$).

an average pore diameter, measured by mercury porosimetry, comprised between 20 and 140 Å, a total pore volume, measured by mercury porosimetry, comprised between 0.1 ml/g and 0.6 ml/g, a total pore volume, measured by nitrogen porosimetry comprised between 0.1 ml/g and 0.6 ml/g, a BET specific surface comprised between 100 and 550 m²/g, a pore volume measured by mercury porosimetry, comprised in the pores with a diameter larger than 140 Å, smaller than 0.1 ml/g, a pore volume, measured by mercury porosimetry, comprised in the pores with a diameter larger than 160 Å, smaller than 0.1 ml/g, a pore volume, measured by mercury porosimetry, comprised in the pores with a diameter larger than 200 Å, smaller than 0.1 ml/g, a pore volume, measured by mercury porosimetry, comprised in the pores with a diameter larger than 500 Å, smaller than 0.01 ml/g, an X-ray diffraction diagram which contains at least the main lines characteristic of at least one of the transition aluminas comprised in the group made up of the alpha, rho, chi, eta, gamma, kappa, theta and delta aluminas.

BRIEF DESCRIPTION OF FIGURES

FIG. 1: Schematic diagram of the process according to a first embodiment of invention.

FIG. 2: Schematic diagram of the process according to a second embodiment of invention.

DETAILED DESCRIPTION OF THE INVENTION

Techniques of Characterization

Figure 3:
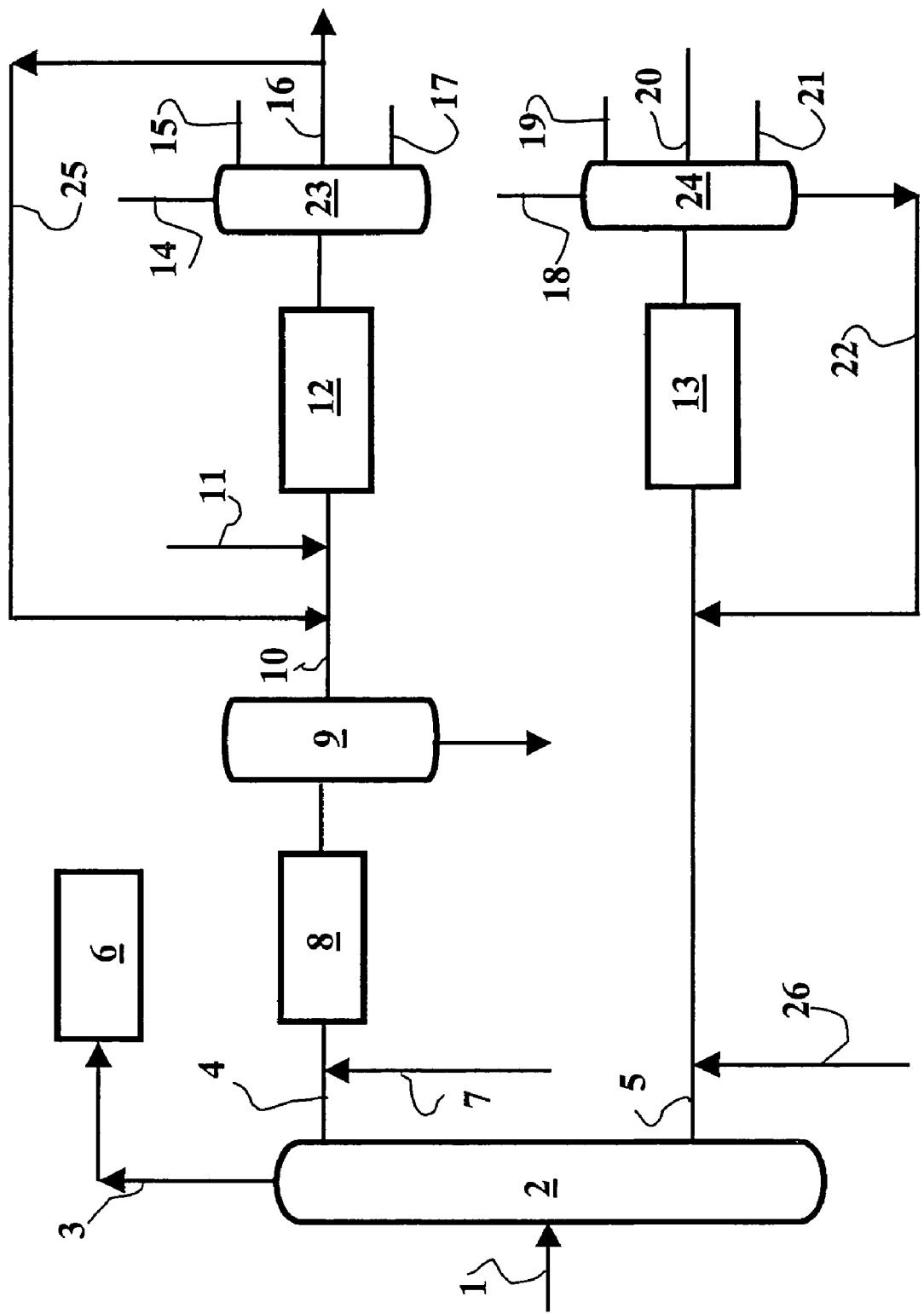
FIG. 3: Schematic diagram of the process according to a third embodiment of invention.

In the following disclosure of the invention, by specific surface is meant the B.E.T. specific surface, determined by adsorption of nitrogen in accordance with the standard ASTM D 3663-78 established starting from the BRUNAUER-EMMETT-TELLER method described in the periodical "The Journal of American Society", 60, 309 (1938).

In the following disclosure of the invention, by mercury volume of the supports and catalysts is meant the volume measured by intrusion with a mercury porosimeter in accordance with the standard ASTM D 4284-83 at a maximum pressure of 4000 bar, using a surface tension of 484 dynes/cm and a contact angle for the amorphous silica-alumina supports of 140°. The average mercury diameter is defined as being a diameter such that all the pores smaller than this diameter constitute 50% of the pore volume ($V_{Hg}$), in a range comprised between 36 Å and 1000 Å. One of the reasons why it is preferable to use the support as a base in order to define the pore distribution lies in the fact that the contact angle of the mercury varies after impregnation of the metals, as a function of the nature and type of metals. The wetting angle has been taken as equal to 140°, following the recommendations of the work "Techniques de l'ingénieur, traité analyse et caracterisation, pages 1050-5, written by Jean Charpin and Bernard Rasneur".

In order to obtain better precision, the mercury volume value in ml/g given in the text which follows, corresponds to the total mercury volume value in ml/g measured on the sample, minus the mercury volume value in ml/g measured on the same sample for a pressure corresponding to 30 psi (approximately 2 bars). The average mercury diameter is also defined as being a diameter such that all the pores smaller than this diameter constitute 50% of the total mercury pore volume.

In order to better characterize the pore distribution, the following mercury pore distribution criteria are finally defined: the volume V1 corresponds to the volume contained in the pores, the diameter of which is smaller than the average diameter minus 30 Å. The volume V2 corresponds to the volume contained in the pores with a diameter greater than the average diameter minus 30 Å and smaller than the average diameter plus 30 Å. The volume V3 corresponds to the volume contained in the pores with a diameter greater than the average diameter plus 30 Å. The volume V4 corresponds to the volume contained in the pores, the diameter of which is smaller than the average diameter minus 15 Å. The volume V5 corresponds to the volume contained in the pores with a diameter greater than the average diameter minus 15 Å and smaller than the average diameter plus 15 Å. The volume V6 corresponds to the volume contained in the pores with a diameter greater than the average diameter plus 15 Å.

The pore distribution measured by nitrogen adsorption was determined by the Barrett-Joyner-Halenda (BJH) model. The adsorption isotherm—nitrogen desorption according to the BJH model is described in the periodical "The Journal of American Society", 73, 373, (1951) written by E. P. Barrett, L. G. Joyner and P. P. Halenda. In the following disclosure of the invention, by nitrogen adsorption volume is meant the volume measured for $P/P_0$=0.99, the pressure for which it is admitted that nitrogen has filled all the pores. The average desorption diameter is defined as being a diameter such that all the pores smaller than this diameter constitute 50% of the pore volume (Vp) measured on the desorption branch of the nitrogen isotherm.

By surface adsorption is meant the surface area measured on the adsorption isotherm branch. Reference will be made for example to the article by A. Lecloux "Mémoires Société Royale des Sciences de Liège, 6th series, Volume 1, part 4, pages 169-209 (1971)."

The sodium content was measured by atomic absorption spectrometry.

X-ray diffraction is a technique which can be used to characterize the supports and catalysts according to the invention. In the disclosure which follows, X-ray analysis is carried out on powder with a Philips PW 1830 diffractometer, operating in reflection mode, and equipped with a rear monochromator and using Cu Kalpha radiation ($\lambda K_{\alpha 1}$=1.7890 Å, $\lambda K_{\alpha 2}$=1.793 Å, intensity ratio $K_{\alpha 1}/K_{\alpha 2}$=0.5). For the X-ray diffraction diagram of the gamma alumina, reference will be made to the ICDD database, file 10-0425. In particular, the two most intense peaks are situated at a position corresponding to a d comprised between 1.39 and 1.40 Å and a d comprised between 1.97 and 2.00 Å. d designates the interreticular distance which is deduced from the angular position using Bragg's ratio (2 $d_{(hkl)}$*sin($\theta$)=n*$\lambda$). By gamma alumina is meant hereafter inter alia for example an alumina comprised within the group composed of the cubic gamma, pseudocubic gamma, tetragonal gamma, poorly or slightly crystallized gamma, high surface area gamma, low surface area gamma aluminas, gamma originating from coarse boehmite, gamma originating from crystallized boehmite, gamma originating from slightly or poorly crystallized boehmite, gamma originating from a mixture of crystallized boehmite and an amorphous gel, gamma originating from an amorphous gel, gamma evolving towards delta. For the positions of the diffraction peaks of the eta, delta and theta aluminas, reference can be made to the article by B. C. Lippens, J. J. Steggerda, in Physical and Chemical aspects of adsorbents and catalysts, E. G. Linsen (Ed.), Academic Press, London, 1970, p. 171-211.

For the supports and catalysts according to the invention, the X-ray diffraction diagram reveals a large peak characteristic of the presence of amorphous silica.

Moreover, in all the text which follows, the alumina compound can contain an amorphous fraction which is difficult to detect by XRD techniques. It is therefore understood by the following that the alumina compounds used or described in the text can contain an amorphous or poorly crystallized fraction.

The supports and catalysts according to the invention were analyzed by MAS NMR of the solid of $^{27}$Al on a spectrometer from the company Brücker, of the MSL 400 type, with a 4 mm probe. The speed of rotation of the samples is of the order of 11 kHz. Potentially, the NMR of aluminium makes it possible to distinguish three types of aluminium, the chemical displacements of which are reported below: Between 100 and 40 ppm, tetra-coordinated-type aluminiums, designated $Al_{IV}$, Between 40 and 20 ppm, penta-coordinated-type aluminiums, designated $Al_V$, Between 20 and −100 ppm, hexa-coordinated-type aluminiums, designated $Al_{VI}$, The aluminium atom is a quadripole nucleus. Under certain analysis conditions (low radiofrequency field: 30 kHz, small pulse angle: π/2 and water-saturated sample), the magic angle spinning (MAS) NMR technique is a quantitative technique. The decomposition of the MAS NMR spectra makes it possible to directly access the quantity of the different species. The spectrum is adjusted in chemical displacement with respect to a 1M aluminium nitrate solution. The aluminium signal is zero ppm. We have chosen to integrate the signals between 100 and 20 ppm for $Al_{IV}$ and $Al_V$, which corresponds to the area 1, and between 20 and −100 ppm for $Al_{VI}$, which corresponds to the area 2. In the disclosure of the invention which follows, by proportion of the octahedral $Al_{VI}$s is meant the following ratio: area 2/(area 1+area 2).

One method of characterization of the supports and catalysts according to the invention which can be used is transmission electron microscopy (TEM). For this, an electron microscope (of the Jeol 2010 type, or Phillips Tecnal20F optionally with scanning) is used, equipped with an energy dispersion spectrometer (EDS) for X-ray analysis (for example a Tracor or an Edax). The EDS detector must allow the detection of light elements. The combination of these two tools, TEM and EDS, makes it possible to combine imaging and local chemical analysis with good spatial resolution.

For this type of analysis, the samples are finely ground dry in a mortar; the powder is then incorporated in resin in order to make ultrafine sections, of approximately 70 nm in thickness. These sections are gathered on Cu grilles covered with an amorphous carbon film with holes, serving as a support. They are then introduced into the microscope for observation and analysis under secondary vacuum. In imaging, the sample zones are then easily distinguished from the resin zones. A certain number of analyses is then carried out; 10 at least, preferably comprised between 15 and 30, on different zones of the industrial sample. The size of the electron beam for analysis of the zones (approximately determining the size of the zones analyzed) is 50 nm in diameter maximum, preferably 20 nm, still more preferably 10, 5, 2 or 1 nm in diameter.

In scanned mode, the zone analyzed will be a function of the size of the zone scanned and not of the size of the beam generally reduced.

The semi-quantitative treatment of the X-ray spectra gathered using the EDS spectrometer makes it possible to obtain the relative concentration of Al and Si (in atomic %) and the Si/Al ratio for each of the zones analyzed. The Si/Al$_m$ average and the standard deviation σ of this set of measurements can then be calculated. In the non-limiting examples of the disclosure of the invention which follows, the 50 nm probe is the probe used in order to characterize the supports and catalysts according to the invention unless otherwise indicated.

The compacted filling density (CFD) is measured in the manner described in the work "Applied Heterogenous Catalysts" by J. F. Le Page, J. Cosyns, P. Courty, E. Freund, J-P. Franck, Y. Jacquin, B. Juguin, C. Marcilly, G. Martino, J. Miquel, R. Montarnal, A. Sugier, H. Van Landeghem, Technip, Paris 1987. A graduated cylinder of acceptable dimensions is filled with catalyst or support by successive additions; and between each addition, the catalyst (or the support) is compacted by shaking the cylinder until a constant volume is reached. This measurement is generally carried out on 1000 cm$^3$ of compacted catalyst or support in a cylinder, the height/diameter ratio of which is approximately 5:1. This measurement can preferably be carried out on automated equipment such as Autotap® by Quantachrome®.

The acidity of the matrix is measured by infrared (IR) spectrometry. The IR spectra are registered on a Nicolet Nexus-670 interferometer under a resolution of 4 cm$^{-1}$ with Happ-Gensel apodization, The sample (20 mg) is pressed into the shape of a self-supporting pellet, is then placed in an in situ analysis cell (25° C. to 550° C., oven out of alignment with the IR beam, secondary vacuum of 10-6 mbar). The diameter of the pellet is 16 mm.

The sample is pretreated in the following fashion in order to eliminate the physisorbed water and partially dehydroxylate the surface of the catalyst in order to obtain an image representative of the acidity of the catalyst during operation:
  temperature rise from 25° C. to 300° C. in three hours
  10-hour plateau at 300° C.
  temperature fall from 300° C. to 25° C. in three hours.

The basis probe (pyridine) is then adsorbed at saturating pressure at 25° C. then thermo-desorbed according to the following plateaux:
  25° C. for 2 hours under secondary vacuum
  100° C. for 1 hour under secondary vacuum
  200° C. for 1 hour under secondary vacuum
  300° C. for 1 hour under secondary vacuum.

A spectrum is registered at 25° C. at the end of the pretreatment and at each desorption plateau in transmission mode with an accumulation time of 100 s. The spectra are brought to iso-mass (thus presumably to iso-thickness) (20 mg exactly). The number of Lewis sites is proportional to the peak surface area, the maximum of which is located towards 1450 cm$^{-1}$, including any shoulder. The number of Bronsted sites is proportional to the surface area of the peak, the maximum of which is located towards 1545 cm$^{-1}$. The ratio of the number of Bronsted sites/number of Lewis sites is estimated to be equal to the ratio of the surface areas of the two peaks described above. The surface area of the peaks at 25° C. is generally used. This B/L ratio is generally calculated starting from the spectrum registered at 25° C. at the end of the pretreatment.

The present invention relates to a hydrocracking/hydroisomerization catalyst which comprises:

a silica-alumina-based, non-zeolitic support with a mass content of silica ($SiO_2$), greater than 5% by weight and less than or equal to 95%, preferably comprised between 10 and 80% by weight, in preferred manner a silica content greater than 20% by weight and less than 80% by weight and still more preferably greater than 25% by weight and less than 75% by weight, the silica content is advantageously comprised between 10 and 50% by weight, preferably a cationic impurities content of less than 0.1% by weight, in preferred manner less than 0.05% by weight and still more preferably less than 0.025% by weight. By cationic impurities content is meant the total alkaline content.

preferably an anionic impurities content of less than 1% by weight, in preferred manner less than 0.5% by weight and still more preferably less than 0.1% by weight.

The silica-alumina used in the process according to the invention is preferably a homogenous silica-alumina on the micrometer scale, and in which the cationic impurities content (for example $Na^+$) is less than 0.1% by weight, in preferred manner less than 0.05% by weight and still more preferably less than 0.025% by weight and the anionic impurities content (for example $SO_4^-$, $Cl^-$) is less than 1% by weight, in preferred manner less than 0.5% by weight and still more preferably less than 0.1% by weight.

Thus any silica-alumina synthesis process known to a person skilled in the art, leading to a homogenous silica-alumina on the micrometer scale and in which the cationic impurities (for example ($Na^+$) can be reduced to less than 0.1% by weight, in preferred manner to a content of less than 0.05% by weight and still more preferably less than 0.025% by weight, and in which the anionic impurities content (for example $SO_4^{2-}$, $Cl^-$) can be reduced to less than 1% by weight, in preferred manner to a content of less than 0.05% by weight is suitable for preparing the supports which are the subject of the invention.

at least one hydro-dehydrogenating element chosen from the group formed by the noble elements of Group VIII of the periodic table, in preferred manner (and preferably is essentially constituted by) 0.05% to 10% by weight of at least one noble metal of Group VIII deposited on an amorphous particular silica-alumina-based support such as described previously. For this particular type of reaction, the metal function is provided by a noble metal of Group VIII of the periodic table of the elements and more particularly platinum and/or palladium. The noble metal content, expressed as % by weight of metal with respect to the catalyst, is preferably comprised between 0.05 and 10% by weight, still more preferably 0.1 to 5% by weight, optionally at least one doping element deposited on the catalyst and chosen from the group formed by phosphorus, boron and silicon. The mass contents of boron, silicon and phosphorus in the form of oxides, are comprised between 0.1 and 15%, preferably between 0.1 and 10%, and still more advantageously between 0.1 and 5% by weight. By doping element is meant an element introduced after the preparation of the silica-alumina support described previously.

an average pore diameter, measured by mercury porosimetry, comprised between 20 and 140 Å, preferably between 40 and 120 Å, and still more preferably between 50 and 100 Å.

preferably a ratio between the volume V2, measured by mercury porosimetry, comprised between the $D_{average}$−30 Å and the $D_{average}$+30 Å, over the total pore volume also measured by mercury porosimetry, greater than 0.6, preferably greater than 0.7 and still more preferably greater than 0.8.

preferably a volume V3 comprised in the pores with diameters greater than $D_{average}$+30 Å, measured by mercury porosimetry, less than 0.1 ml/g, preferably less than 0.06 ml/g, and still more preferably less than 0.04 ml/g.

preferably a ratio between the volume V5, comprised between the $D_{average}$−15 Å and the $D_{average}$+15 Å, measured by mercury porosimetry, and the volume V2, comprised between the $D_{average}$−30 Å and the $D_{average}$+30 Å, measured by mercury porosimetry, greater than 0.6, preferably greater than 0.7 and still more preferably greater than 0.8.

preferably a volume V6 comprised in the pores with diameters greater than $D_{average}$+15 Å, measured by mercury porosimetry, less than 0.2 ml/g, preferably less than 0.1 ml/g, and still more preferably less than 0.05 ml/g.

a total pore volume, measured by mercury porosimetry, comprised between 0.1 ml/g and 0.6 ml/g, preferably comprised between 0.20 ml/g and 0.50 ml/g, and still more preferably greater than 0.20 ml/g.

a total pore volume, measured by nitrogen porosimetry, comprised between 0.1 ml/g and 0.6 ml/g, preferably comprised between 0.20 and 0.50 ml/g, a BET specific surface comprised between 100 and 550 $m^2/g$, preferably comprised between 150 and 500 $m^2/g$.

preferably a surface adsorption such that the ratio between the surface adsorption and the BET surface is greater than 0.5, in preferred manner greater than 0.65, and more preferably greater than 0.8.

a pore volume, measured by mercury porosimetry, comprised in the pores with a diameter greater than 140 Å of less than 0.1 ml/g, preferably less than 0.05 ml/g and still more preferably less than 0.03 ml/g.

a pore volume, measured by mercury porosimetry, comprised in the pores with a diameter greater than 160 Å of less than 0.1 ml/g, preferably less than 0.05 ml/g and still more preferably less than 0.025 ml/g.

a pore volume, measured by mercury porosimetry, comprised in the pores with a diameter greater than 200 Å of less than 0.1 ml/g, preferably less than 0.05 ml/g and still more preferably less than 0.025 ml/g.

a pore volume, measured by mercury porosimetry, comprised in the pores with a diameter greater than 500 Å of less than 0.01 ml/g.

an X-ray diffraction diagram which contains at least the main lines characteristic of at least one of the transition aluminas comprised in the group made up of the rho, chi, kappa, eta, gamma, theta and delta aluminas, and preferably which contains at least the main lines characteristic of at least one of the transition aluminas comprised in the group made up of the gamma, eta, theta and delta alumina, and still more preferably which contains at least the main lines characteristic of the gamma and eta alumina, and still more preferably which contain the peaks at a d comprised between 1.39 and 1.40 Å, and at a d comprised between 1.97 and 2.00 Å.

The MAS NMR spectra of the $^{27}Al$ solid of the supports and catalysts show two multiplets with distinct peaks. A first type of aluminium, the maximum of which resonates towards 10 ppm extends between −100 and 20 ppm. The position of the maximum suggests that these species are essentially of $Al_{VI}$ type (octahedral). A second type of minority aluminium, the maximum of which resonates towards 60 ppm extends between 20 and 110 ppm. This multiplet can be decomposed into at least two species. The predominant species of this multiplet would correspond to the atoms of $Al_{IV}$ type (tetrahedral). For the supports and catalysts of the present invention, advantageously the proportion of the octahedral $Al_{VI}$ atoms is greater than 50%, preferably greater than 60%, and still more preferably greater than 70%.

In one embodiment of the invention, the catalyst contains a support comprising at least two silica-alumina zones, said zones having Si/Al ratios less than or greater than the overall Si/Al ratio determined by X-ray fluorescence. Thus a support having an Si/Al ratio equal to 0.5 comprises for example two silica-alumina zones, one of the zones has an Si/Al ratio determined by TEM of less than 0.5 and the other zone has an Si/Al ratio determined by TEM comprised between 0.5 and 2.5.

In another embodiment of the invention, the catalyst contains a support comprising one single silica-alumina zone, said zone having an Si/Al ratio equal to the overall Si/Al ratio determined by X-ray fluorescence and less than 2.3.

The compacted filling density of the catalysts is generally greater than 0.85 $g/cm^3$, preferably greater than 0.95 $g/cm^3$, highly preferably greater than 1.025 $g/cm^3$, and still more preferably greater than 1.1 $g/cm^3$.

The acidity of the catalyst support can be advantageously measured, without this restricting the scope of the invention, by IR monitoring of the thermo-desorption of the pyridine. Generally, the B/L ratio, as described above, of the support according to the invention, is comprised between 0.05 and 1, in preferred manner between 0.05 and 0.7, highly preferably between 0.06 and 0.3 and still more preferably between 0.075 and 0.15.

Preparation Processes

The catalysts according to the invention can be prepared according to all the methods well known to a person skilled in the art.

A preferred process for preparation of the catalyst according to the present invention comprises the following stages:

According to a preferred method of preparation, the precursor is obtained by direct moulding of the silica-alumina alone, or by moulding of the silica-alumina with at least one binding agent, then drying and calcination. The elements of Groups VIB and/or VIII, and optionally those chosen from phosphorus, boron, silicon and optionally the elements of Groups VB and VIIB, are then optionally introduced by any method known to a person skilled in the art, before or after the moulding and before or after the calcination of the precursor or of the catalyst.

The hydrogenating element can be introduced at any stage of the preparation, preferably during the mixing, or highly preferably during the moulding. The moulding is followed by calcination, the hydrogenating element can also be introduced before or after this calcination. The preparation is generally concluded by calcination at a temperature of 250 to 600° C. Another of the preferred methods according to the invention consists of moulding the silica-alumina without binding agent after kneading of the latter, then passing the paste thus obtained through a die in order to form extrudates with a diameter comprised between 0.4 and 4 mm. The hydrogenating function can then be introduced only partially, or totally, at the time of kneading. It can also be introduced by one or more ion exchange operations on the calcinated support constituted by at least one silica-alumina, optionally moulded with a binding agent, using solutions containing the precursor salts of the metals chosen. It can also be introduced by one or more operations of impregnation of the moulded and calcinated support, by a solution of the precursors of the metal oxides. It can finally also be introduced, in highly preferred fashion, by one or more operations of impregnation of the moulded and calcinated support, constituted by at least one silica-alumina according to the invention and optionally at least one binding agent, by solutions containing the precursors of the oxides of metals of Groups VI and/or VIII, precursors of the oxides of metals of Group VIII being preferably introduced after those of Group VIB or at the same time as the latter.

In preferred fashion, the support is impregnated by an aqueous solution. The impregnation of the support is preferably carried out by the "dry" impregnation method, well known to a person skilled in the art. The impregnation can be carried out in a single stage by a solution containing all the elements constituting the final catalyst.

The catalyst of the present invention thus contains at least one noble element of Group VIII such as ruthenium, rhodium, palladium, osmium, iridium or platinum. Among the noble metals of Group VIII it is preferable to use at least one metal chosen from the group formed by platinum and palladium.

The following elements: boron and/or silicon and/or phosphorus can be introduced into the catalyst at any level of the preparation and according to any technique known to a person skilled in the art.

The catalyst, generally, contains no added halogen, other than that which could be introduced for the impregnation, the noble metal for example.

A preferred method according to the invention consists of depositing the doping element or elements chosen, for example the boron-silicon pair, on the calcinated or non-calcinated precursor, preferably calcinated. For this purpose, an aqueous solution is prepared, of at least one boron salt such as ammonium biborate or ammonium pentaborate in an alkaline medium and in the presence of oxygenated water and "dry" impregnation is then carried out, in which the volume of the pores of the precursor is filled by the solution containing for example boron. In the case of, for example, silicon also being deposited, a solution of a silicon compound of the silicone type or silicone oil emulsion will be used.

The depositing of boron and silicon can also be carried out in simultaneous manner, using for example a solution containing a boron salt and a silicon compound of the silicone type. Thus, for example in the case where the precursor is a nickel-tungsten type catalyst supported on silica-alumina, it is possible to impregnate this precursor by the aqueous solution of ammonium biborate and Rhodorsil E1P silicone from the company Rhodia, followed by drying for example at 120° C., then impregnating with a solution of ammonium fluoride, followed by drying for example at 120° C., then calcination, for example in preferred fashion under air on a bed crossed for example at 500° C., for 4 hours.

The doping element(s) chosen from the group formed by silicon, boron and phosphorus can be introduced by one or more impregnation operations with an excess of solution on the calcinated precursor.

When, optionally, at least one doping element, B and/or P and/or Si, is introduced, its distribution and its localization can be determined by techniques such as Castaing microprobe (distribution profile of the various elements), transmission electron microscopy coupled with X-ray analysis of the components of the catalysts, or also by mapping the distribution of the elements present in the catalyst by electronic microprobe. These techniques make it possible to demonstrate the presence of these exogenic elements added after the synthesis of the silica-alumina according to the invention.

The boron source can be boric acid, preferably orthoboric acid $H_3BO_3$, ammonium biborate or pentaborate, boron oxide, boric esters. The boron can for example be introduced in the form of a mixture of boric acid, oxygenated water and a basic organic compound containing nitrogen such as ammonium hydroxide, the primary and secondary amines, cyclic amines, the compounds of the family of pyridine and the quinolines, and the compounds of the pyrrole family. The boron can be introduced for example by a solution of boric acid in a water/alcohol mixture.

The preferred phosphorus source is orthophosphoric acid $H_3PO_4$, but its salts and esters, like the ammonium sulphates, are also suitable. The phosphorus can for example be introduced in the form of a mixture of phosphoric acid and a basic organic compound containing nitrogen, such as ammonium hydroxide, the primary and secondary amines, cyclic amines, the compounds of the family of pyridine and the quinolines, and the compounds of the pyrrole family.

Numerous sources of silicon can be used. Thus, it is possible to use ethyl orthosilicate $Si(OEt)_4$, the siloxanes, polysiloxanes, silicones, silicone emulsions, halide silicates such as ammonium fluorosilicate $(NH_4)_2SiF_6$ or sodium fluorosilicate $Na_2SiF_6$. Silicomolybdic acid and its salts, silicotungstic acid and its salts can also be advantageously used. Silicon can be added for example by impregnation of ethyl silicate in solution in a water/alcohol mixture. The silicon can be added for example by impregnation of a silicon compound of the silicone type, or silicic acid suspended in water.

The noble metals of Group VIII of the catalyst of the present invention can be present in their totality or partially in metal and/or oxide form.

The sources of noble elements of Group VIII which can be used are well known to a person skilled in the art. For noble metals the halides will be used, for example the chlorides, nitrates, the acids such as chloroplatinic acid, the oxychlorides such as ammoniated ruthenium oxychloride.

Characteristics of the Support

The catalyst thus obtained is prepared, by any technique known to a person skilled in the art, starting from a silica-alumina-based, non-zeolite support (i.e. comprising silica and alumina) the characteristics of which are the following:

the mass silica content ($SiO_2$) is greater than 5% by weight and less than or equal to 95% by weight of silica ($SiO_2$), preferably comprised between 10 and 80% by weight, in preferred manner a silica content greater than 20% by weight and less than 80% by weight and still more preferably greater than 25% by weight and less than 75% by weight, the silica content is advantageously between 10 and 50% by weight.

preferably the anionic impurities content is less than 1% by weight, in preferred manner less than 0.05% by weight and still more preferably less than 0.025% by weight. By cationic impurities is meant their total alkaline content.

preferably the anionic impurities content is less than 1% by weight, in preferred manner less than 0.5% by weight and still more preferably less than 0.1% by weight.

the average pore diameter, measured by mercury porosimetry, is comprised between 20 and 140 Å, preferably between 40 and 120 Å, and still more preferably between 50 and 100 Å, preferably the ratio between the volume V2, measured by mercury porosimetry, comprised between the $D_{average}$−30 Å and the $D_{average}$+30 Å, over the total pore volume also measured by mercury porosimetry, is greater than 0.6, preferably greater than 0.7 and still more preferably greater than 0.8.

preferably the volume V3 comprised in the pores with diameters greater than $D_{average}$+30 Å, measured by mercury porosimetry, is less than 0.1 ml/g, preferably less than 0.06 ml/g, and still more preferably less than 0.04 ml/g.

preferably the ratio between the volume V5, measured by mercury porosimetry, comprised between the $D_{average}$−15 Å and the $D_{average}$+15 Å, over the volume V2, measured by mercury porosimetry, comprised between the $D_{average}$−30 Å and the $D_{average}$+30 Å, is greater than 0.6, preferably greater than 0.7 and still more preferably greater than 0.8.

preferably the volume V6 comprised in the pores with diameters greater than $D_{average}$+15 Å, measured by mercury porosimetry, is less than 0.2 ml/g, preferably less than 0.1 ml/g, and still more preferably less than 0.05 ml/g.

the total pore volume, measured by mercury porosimetry, is comprised between 0.1 ml/g and 0.6 ml/g, preferably comprised between 0.20 ml/g and 0.50 ml/g, and still more preferably greater than 0.20 ml/g.

the total pore volume, measured by nitrogen adsorption, is comprised between 0.1 ml/g and 0.6 ml/g, preferably comprised between 0.20 and 0.50 ml/g.

the BET specific surface is comprised between 100 and 550 $m^2/g$, preferably comprised between 150 and 500 $m^2/g$.

preferably the surface adsorption is such that the ratio between the surface adsorption and the BET surface is greater than 0.5, more preferably greater than 0.65, and still more preferably greater than 0.8.

the pore volume, measured by mercury porosimetry, comprised in the pores with a diameter greater than 140 Å is less than 0.1 ml/g, preferably less than 0.05 ml/g and still more preferably less than 0.03 ml/g.

the pore volume, measured by mercury porosimetry, comprised in the pores with a diameter greater than 160 Å is less than 0.1 ml/g, preferably less than 0.05 ml/g and still more preferably less than 0.025 ml/g.

the pore volume, measured by mercury porosimetry, comprised in the pores with a diameter greater than 200 Å is less than 0.1 ml/g, preferably less than 0.05 ml/g and still more preferably less than 0.025 ml/g.

the pore volume, measured by mercury porosimetry, comprised in the pores with a diameter greater than 500 Å is less than 0.01 ml/g.

the X-ray diffraction diagram contains at least the main lines characteristic of at least one of the transition aluminas comprised in the group made up of the alpha, rho, chi, kappa, eta, gamma, theta and delta aluminas, preferably it contains at least the main lines characteristic of at least one of the transition aluminas comprised in the group made up of the gamma, eta, theta and delta alumina, in more preferred manner it contains at least the main lines characteristic of the gamma and eta alumina, and still more preferably it contains the peaks at a d comprised between 1.39 and 1.40 Å, and at a d comprised between 1.97 and 2.00 Å.

The MAS NMR spectra of the $^{27}Al$ solid of the supports show two multiplets with distinct peaks. A first type of aluminium, the maximum of which resonates towards 10 ppm extends between −100 and 20 ppm. The position of the maximum suggests that these species are essentially of $Al_{VI}$ type (octahedral). A second type of minority aluminium, the maximum of which resonates towards 60 ppm extends between 20 and 110 ppm. This multiplet can be decomposed into at least two species. The predominant species of this multiplet would correspond to the atoms of $Al_{IV}$ type (tetrahedral). For the supports and catalysts of the present invention, advantageously the proportion of the octahedral $Al_{VI}$ atoms is greater than 50%, preferably greater than 60%, and still more preferably greater than 70%.

In one embodiment. of the invention, the support comprises at least two silica-alumina zones having Si/Al ratios less than or greater than the overall Si/Al ratio determined by X-ray fluorescence. A support according to the invention having an overall Si/Al ratio equal to 0.5 comprises for example two silica-alumina zones, one of the zones has an Si/Al ratio determined by TEM of less than 0.5 and the other zone has an Si/Al ratio determined by TEM comprised between 0.5 and 2.5.

In another embodiment of the invention, the support comprises one single silica-alumina zone having an Si/Al ratio equal to the overall Si/Al ratio determined by X-ray fluorescence and less than 2.3.

The acidity of the support according to the invention can be advantageously measured, without this restricting the scope of the invention, by IR monitoring of the thermo-desorption of the pyridine. Generally, the B/L ratio, as described above, of the support according to the invention, is comprised between 0.05 and 1, in preferred manner between 0.05 and 0.7, highly preferably between 0.06 and 0.3 and still more preferably between 0.075 and 0.15.

The compacted filling density of the supports, after calcination is generally greater than 0.65 $g/cm^3$, preferably greater than 0.72 $g/cm^3$, highly preferably greater than 0.75 $g/cm^3$, and still more preferably greater than 0.78 $g/cm^3$.

Preparation of the Support

The applicant has discovered that the silica-alumina supports obtained starting from a mixture at any stage of a partially soluble alumina compound in acid medium with a totally soluble silica compound or with a totally soluble combination of alumina and hydrated silica, moulded following hydrothermal or thermal treatment in order to homogenize it on the micrometer scale, even on the nanometer scale made it possible to obtain a particularly active catalyst in the hydrocracking processes. By partially soluble in acid medium, the applicant understands that bringing the alumina compound into contact before any addition of the totally soluble silica compound or of the combination with an acid solution for example nitric acid or sulphuric acid causes their partial dissolution.

Silica Sources

The silica compounds used according to the invention can have been chosen from the group formed by silicic acid, the sols of silicic acid, the hydrosoluble alkaline silicates, the cationic salts of silicon, for example hydrated sodium metasilicate, Ludox® in ammoniacal form or in alkaline form, the quaternary ammonium silicates. The silica sol can be prepared according to one of the methods known to a person skilled in the art. Preferably, a decationized orthosilicic acid solution is prepared starting from a hydrosoluble alkaline silicate by ion exchange on a resin.

Sources of Totally Soluble Silica-Aluminas

The totally soluble silica-aluminas used according to the invention can be prepared by true coprecipitation under controlled stationary operating conditions (pH, concentration, temperature, average residence time) by reaction of a basic solution containing silicon, for example in the form of sodium silicate, optionally aluminium for example in the form of sodium aluminate with an acid solution containing at least one aluminium salt for example aluminium sulphate. At least one carbonate or also $CO_2$ can optionally be added to the reaction medium.

By true coprecipitation, the applicant understands a process by which at least one aluminium compound which is totally soluble in basic or acid medium as described below, at least one silicon compound as described below are brought into contact, simultaneously or sequentially, in the presence of at least one precipitating and/or coprecipitating compound in order to obtain a mixed phase essentially constituted by hydrated silica-alumina which is optionally homogenized by intensive agitation, shearing, colloidal grinding or also by a combination of these unitary operations. For example, these hydrated silica-aluminas can have been prepared according to the teachings of U.S. Pat. Nos. 2,908,635; 3,423,332; 3,433,747; 3,451,947; 3,629,152; 3,650,988.

The complete dissolving of the silica compound or of the combination was evaluated approximately according to the following method. A fixed quantity (15 g) of the silica compound or of the hydrated combination is introduced into a medium with preestablished pH. Preferably, the concentration of solid introduced per litre of suspension is 0.2 mole per litre. The pH of the dispersion solution is at least 12 and it can be obtained by using an alkaline source. Preferably, it is useful to use NaOH. The mixture is then agitated mechanically by a deflocculating turbine agitator for 30 minutes at 800 rpm. Once agitation is concluded, the mixture is centrifuged for 10 minutes at 3000 rpm. The cake is separated from the supernatant liquid. The solution was filtered on a filter with a porosity of 4, with a diameter of 19 cm, followed by drying then calcination at 1000° C. of the two fractions. Then, an equal ratio is defined by dividing the mass decanted by the mass of solid in suspension. By totally soluble is meant a ratio R at least greater than 0.9.

Alumina Sources

The alumina compounds used according to the invention are partially soluble in acid medium. Some or all are chosen from the group of alumina compounds of general formula $Al_2O_3,nH_2O$. In particular hydrated compounds of alumina can be used such as: hydrargillite, gibbsite, bayerite, boehmite, pseudo-boehmite and amorphous or essentially amorphous alumina gels. The dehydrated forms of these compounds can also be used, which are constituted by transition aluminas and which comprise at least one of the phases taken from the group: rho, chi, eta, gamma, kappa, theta and delta, which are essentially differentiated by the organization of their crystalline structure. The alpha alumina commonly called corindon can be incorporated in a low proportion into the support according to the invention.

This property of partial dissolving is a sought property of the invention, it applies to hydrated alumina powders, atomized hydrated alumina powders, dispersions or suspensions of hydrated alumina or to any one of their combinations, before any addition of a compound wholly or partly containing silicon.

The partial dissolving of the alumina compound was evaluated approximately according to the following method. A precise quantity of alumina in powder or in suspension is introduced into a medium with a preestablished pH. The mixture is then agitated mechanically. Once the agitation is concluded, the mixture is left without agitation for 24 hours. Preferably, the solid concentration of $Al_2O_3$ introduced per litre of suspension is 0.5 mole per litre. The pH of the dispersion solution is 2 and is obtained either by using $HNO_3$ or HCl, or $HClO_4$. Preferably, it is useful to use $HNO_3$. The distribution of the settled and dissolved fractions was followed by assay of the aluminium by UV absorption. The supernatants were ultrafiltered (polyethersulphone membrane, Millipore NMWL; 30,000) and digested in concentrated acid. The quantity of aluminium in the supernatant corresponds to the non-settled alumina compound and the dissolved aluminium and the ultrafiltered fraction to the dissolved aluminium only. The quantity of settled particles is deducted from the theoretical concentration of aluminium in the dispersion (considering that all the solid introduced is dispersed) and the quantities of boehmite actually dispersed and aluminium in solution.

The alumina precursors used according to the present invention are therefore distinguished from those used in the case of the true coprecipitations, which are entirely soluble in acid medium: cationic salts of alumina, for example aluminium nitrate. The methods forming part of the invention are distinguished from the true coprecipitations as one of the elements, in this case the aluminium compound, is partially soluble.

In order to utilize the alumina, any alumina compound of general formula $Al_2O_3$, $nH_2O$ can be used. Its specific surface is comprised between 150 and 600 m$^2$/g. In particular hydrated compounds of alumina can be used such as: hydrargillite, gibbsite, bayerite, boehmite, pseudo-boehmite and amorphous or essentially amorphous alumina gels. The dehydrated forms of these compounds can also be used, which are constituted by transition aluminas and which comprise at least one of the phases taken from the group: rho, chi, eta, gamma, kappa, theta, delta and alpha which are essentially differentiated by the organization of their crystalline structure. During the heat treatments, these different forms are capable of evolving among themselves, according to a complex relationship which depends on the operating conditions of the treatment. The alpha alumina commonly called corindon can also be used in measured proportions.

The aluminium hydrate $Al_2O_3$, $nH_2O$ used more preferentially is boehmite, pseudo-boehmite and the amorphous or essentially amorphous alumina gels. A mixture of these products in any combination can also be used.

Boehmite is generally described as being an aluminium monohydrate of formula $Al_2O_3$, $nH_2O$ which in reality encompasses a broad continuum of materials with variable degrees of hydration and organization with more or less well defined boundaries: the most hydrated gelatinous boehmite, with n being able to be greater than 2, the pseudo-boehmite or micro-crystalline boehmite with n comprised between 1 and 2, then the crystalline boehmite and finally the well-crystallized boehmite in large crystals with n close to 1. The morphology of the aluminium monohydrate can vary within wide limits between these two extreme acicular or prismatic forms. A whole collection of variable forms can be used between these two forms: chain, boats, interlaced platelets.

The preparation and/or moulding of the aluminium hydrate can also constitute the first stage of preparation of these catalysts. Numerous patents report the preparation and/or moulding of transition alumina-based supports originating from aluminium monohydrate: U.S. Pat. No. 3,520,654; U.S. Pat. No. 3,630,670; U.S. Pat. No. 3,864,461; U.S. Pat. No. 4,154,812; U.S. Pat. No. 4,313,923; DE 3243193; U.S. Pat. No. 4,371,513.

Relatively pure aluminium hydrates can be used in the form of amorphous powders or crystallized, or crystallized containing an amorphous part. Aluminium hydrate can also be introduced in the form of aqueous suspensions or dispersions. The aluminium hydrate aqueous suspensions or dispersions used according to the invention can be gelled or coagulated. The aqueous dispersions or suspensions can also be obtained as well known to a person skilled in the art by peptization in water or acidulated water of aluminium hydrates.

The dispersion of aluminium hydrate can be carried out by any process known to a person skilled in the art: in a batch reactor, a continuous mixer, a kneader, a colloidal grinder. Such a mixture can also be produced in a piston flow reactor and, in particular in a static mixer. Lightnin reactors can be mentioned.

Moreover, it is also possible to use as an alumina source an alumina having been subjected beforehand to a treatment capable of improving its degree of dispersion. By way of example, the dispersion of the alumina source can be improved by a preliminary homogenization treatment. By homogenization, at least one of the homogenization treatments described in the text which follows can be used.

The aqueous dispersions or suspensions of alumina which can be used are in particular the aqueous suspensions or dispersions of fine or ultra-fine boehmites which are composed of particles having dimensions in the colloidal range.

Fine or ultra-fine boehmites used according to the present invention can in particular have been obtained according to French Patent 1,261,182 and 1,381,282 or in European Patent Application No. 15,196.

Aqueous suspensions or dispersions obtained starting from pseudo-boehmite, amorphous alumina gels, aluminium hydroxide or ultra-fine hydrargillite gels can also be used.

Aluminium monohydrate can be bought from a variety of commercial sources of alumina, such as in particular PURAL®, CATAPAL®, DISPERAL®, DISPAL® marketed by the company SASOL or also HIQ® marketed by ALCOA, or according to the methods known to a person skilled in the art; it can be prepared by partial dehydration of aluminium trihydrate by the standard methods or it can be prepared by precipitation. When these aluminas are presented in the form of a gel, they are peptized by water or an acidulated solution. In precipitation, the acid source can be for example chosen from at least one of the following compounds: aluminium chloride, aluminium sulphate, aluminium nitrate. The basic source of aluminium can be chosen from the basic salts of aluminium such as sodium aluminate and potassium aluminate.

As precipitating agents, sodium hydroxide, sodium carbonate, potash and ammonium hydroxide can be used. The precipitating agents are chosen in such a manner that the alumina source according to the present invention and these agents are precipitated together.

Depending on the acid or basic nature of the starting aluminium-based compound, the aluminium hydrate is precipitated using a base or an acid chosen, for example, from hydrochloric acid, sulphuric acid, sodium hydroxide, or a basic or acid compound of aluminium such as mentioned above. The two reagents can be aluminium sulphate and sodium aluminate. For an example of the preparation of aluminium alpha-monohydrate using aluminium sulphate and sodium aluminate, reference can be made in particular to U.S. Pat. No. 4,154,812.

The pseudo-boehmite can in particular have been prepared according to the process described in U.S. Pat. No. 3,630,670 by reaction of an alkaline aluminate solution with a solution of a mineral acid. The pseudo-boehmite can in particular have been prepared according to the process described in U.S. Pat. No. 3,630,670 by reaction of an alkaline aluminate solution with a solution of a mineral acid. It can also have been prepared as described in the French Patent FR 1,357,830.

The amorphous alumina gels can in particular have been prepared according to the processes described in the article "Alcoa paper No. 19 (1972) pages 9 to 12" and in particular by reaction of acid aluminate or of an aluminium salt or by hydrolysis of aluminium alcoholates or by hydrolysis of basic salts of aluminium.

The aluminium hydroxide gels can in particular be those which have been prepared according to the processes described in U.S. Pat. Nos. 3,268,295 and 3,245,919.

The aluminium hydroxide gels can in particular be those which have been prepared according to the processes described in the Patent WO 00/01617, by mixing of an aluminium source and a base or of a basic aluminium source and an acid in order to precipitate an alumina monohydrate, the following stages being:

2. ripening
3. filtration
4. washing, and
5. drying, processes characterized in that the mixing of stage one is carried out without retro-mixing.

The ultra-fine hydrargillite can in particular have been prepared according to the process described in U.S. Pat. No. 1,371,808, by evolution at a temperature comprised between ambient temperature and 60° C. of alumina gels in the form of cake, and containing with respect to the alumina counted in molecules of $Al_2O_3$ 0.1 monovalent acid ions.

It is also possible to use the ultra pure aqueous suspensions or dispersions of boehmite or pseudo-boehmite prepared according to a process in which an alkaline aluminate is reacted with carbon dioxide in order to form a precipitate of amorphous aluminium hydroxycarbonate, the precipitate obtained is separated by filtration, then the latter is washed (the process is in particular described in U.S. Pat. No. 3,268,295). Then, a) in a first stage, the washed precipitate of amorphous aluminium hydroxycarbonate is mixed with an acid solution, a base or a salt or their mixtures; this mixture is carried out by pouring the solution into the hydroxycarbonate, the pH of the medium thus constituted being less than 11.

b) in a second stage, the reaction medium thus constituted is heated at a temperature below 90° C. for a period of at least 5 minutes.

c) in a third stage, the medium resulting from the second stage is heated at a temperature comprised between 90° C. and 250° C.

The dispersions or suspensions of boehmite and pseudo-boehmite obtained according to this process have an alkaline content of less than 0.005% expressed in the form of the weight ratio alkali metal oxide/$Al_2O_3$.

When it is desirable to manufacture very pure catalyst supports, ultra-pure suspensions or dispersions of boehmite and pseudo-boehmite are preferably used, which have been obtained according to the process which has been described above, or the aluminium hydroxide gels which have been prepared starting from the hydrolysis of the aluminium alcoholates according to a process of the type described in U.S. Pat. No. 2,892,858.

A brief description follows of the manufacturing process which leads to such aluminium hydroxide gels of boehmite type obtained as a by-product in the manufacture of alcohol by hydrolysis of an alcoholate or aluminium alkoxide (Ziegler synthesis). The Ziegler alcohol synthesis reactions are described in particular in U.S. Pat. No. 2,892,858. According to this process, firstly triethylaluminium is prepared starting from aluminium, hydrogen and ethylene, the reaction being carried out in two stages with partial recycling of triethylaluminium.

Ethylene is added in the polymerization stage and the product obtained is then oxidized in aluminium alcoholate, the alcohols being obtained by hydrolysis.

The aluminium hydroxide gels can also be those which have been prepared according to the processes described in U.S. Pat. Nos. 4,676,928-A and 6,030,599.

The hydrated alumina obtained as a by-product of the Ziegler reaction is in particular described in a bulletin of the company CONOCO of 19 Jan. 1971.

The dimension of the alumina particles constituting the alumina source can vary within broad limits. It is generally comprised between 1 and 100 microns.

Methods

The support can be advantageously prepared by one of the methods described below.

By way of example, a method for preparation of a silica-alumina forming part of the invention consists of preparing, starting from a hydrosoluble alkaline silicate an orthosilicic acid solution ($H_2SiO_4$, $H_2O$) decationized by ion exchange, then simultaneously adding to a cationic salt of aluminium in solution for example the nitrate and to ammonium hydroxide under controlled operating conditions; or also adding the solution of orthosilicic acid to the cationic salt of aluminium in solution and coprecipitating the solution obtained by ammonium hydroxide under controlled operating conditions leading to a homogenous product. This silica-alumina hydrogel is mixed with the powder or a suspension of aluminium hydrate. After filtration and washing, drying with moulding then calcination preferentially under air, in a rotary oven, at a high temperature and for a time sufficient to promote the interactions between alumina and silica, generally at least 2 hours, a support corresponding to the characteristics of the invention is obtained.

Another method for preparing silica-alumina according to the invention consists of precipitating the alumina hydrate as above, filtering and washing it, then mixing it with aqueous orthosilicic acid in order to obtain a suspension, which is thoroughly homogenized by vigorous agitation and shearing. An Ultraturrax turbine or also a Staro turbine can be used, or also a colloidal grinder for example, a Staro colloidal grinder. The homogenous suspension is then dried by atomization as above, then calcinated between 500 and 1200° C. for at least 3 hours: a silica-alumina support which can be used in the process according to the invention is obtained.

Another method forming part of the invention consists of preparing as above a decationized solution of orthosilicic acid then adding simultaneously or consecutively to an alumina compound, for example an aluminium hydrate in powder or acidulated suspension. In order to increase the diameter of the pores of the final silica-alumina support, at least one basic compound can optionally be added to the reaction medium. After accelerated hydrogenation of the suspension by agitation, optional adjustment by filtration of the content of dry matter then optionally re-homogenization, the product is dried with moulding, simultaneously or consecutively, then calcinated as above.

Another method also forming part of the invention consists of preparing an aqueous suspension or dispersion of alumina, for example an aluminium monohydrate, then simultaneously or consecutively adding to a silica compound, for example a sodium silicate. In order to increase the diameter of the pores of the final silica-alumina support, at least one basic compound can optionally be added to the reaction medium. The support is obtained by filtration and washing, optionally washing by an ammoniacal solution in order to extract by ion exchange the residual sodium, drying with moulding simultaneously or consecutively. After drying with moulding then calcination as above, a support corresponding to the characteristics of the invention is obtained. The size of the particles of alumina used is preferably comprised between 1 and 100 microns in order to obtain good homogenization of the silica-alumina support according to the invention.

In order to increase the diameter of the mesopores of the silica-alumina support, it can be particularly advantageous, according to the teaching of U.S. Pat. No. 4,066,574, to prepare an aqueous suspension or dispersion of alumina, for example an aluminium monohydrate then neutralizing by a basic solution, for example ammonium hydroxide, then adding it simultaneously or consecutively to a silica compound for example a decationized solution of orthosilicic acid. After accelerated homogenization of the suspension by intense agitation, optional adjustment by filtration of the content of dry matter then re-homogenization, the product is dried with moulding simultaneously or consecutively, then calcinated as above. This method also forms part of the methods used according to the invention.

In the disclosure of the abovementioned methods, homogenization is used in order to describe the re-dissolving of a product containing a solid fraction, for example a suspension, a powder, a filtered precipitate, then its dispersion under intense agitation. The homogenization of a dispersion is a process well known to a person skilled in the art. Said homogenization can be carried out by any process known to a person skilled in the art; by way of example in a batch reactor, a continuous mixer, a kneader. Such mixing can be carried out in a piston flow reactor and, in particular in a static reactor. Lightnin reactors can be mentioned. An Ultraturrax® or also a Staro® turbine can be used, or also a colloidal grinder for example, a Staro colloidal grinder. The IKA® commercial colloidal grinders can also be used.

In all the abovementioned methods, it may optionally be desirable to add, during any stage of the preparation, a minor proportion of at least one stabilizing element chosen from the group formed by zirconia and titanium. The stabilizing element is preferably added in the form of a soluble salt.

Moulding of the Supports and Catalysts

The support can be obtained by moulding silica-alumina by any technique known to a person skilled in the art. The moulding can be carried out for example by extrusion, pelleting, by the drop coagulation (oil-drop) method, by granulation on a turntable, or by any other method well known to a person skilled in the art.

The moulding can also be carried out in the presence of different constituents of the catalyst and extrusion of the mineral paste obtained, by pelleting, moulding in the form of beads on a turning plate or drum, drop coagulation, oil-drop, oil-up or any other known process for agglomeration of a powder containing alumina and optionally other ingredients chosen from those mentioned above.

The catalysts used according to the invention have the shape of spheres or extrudates. It is however advantageous for the catalyst to be presented in the form of extrudates with a diameter comprised between 0.5 and 5 mm and more particularly between 0.7 and 2.5 mm. The shapes are cylindrical (which may or may not be hollow), twisted cylindrical, multilobed (2, 3, 4 or 5 lobes for example), rings. The cylindrical shape is preferably used, but any other shape can be used.

Moreover, these supports used according to the present invention can have been treated as is well known to a person skilled in the art by additives in order to facilitate the moulding and/or improve the final mechanical properties of the silica-alumina supports. As examples of additives, there may in particular be mentioned cellulose, carboxymethyl-cellulose, carboxyethyl-cellulose, tall-oil, xanthan gum, surface-active agents, flocculating agents such as the polyacrylamides, carbon black, starches, stearic acid, polyacrylic alcohol, polyvinylic alcohol, biopolymers, glucose, polyethylene glycols etc.

Adjustment of the porosity characteristic of the supports of the invention is partially carried out during this stage of moulding the support particles.

The moulding can be carried out by using the moulding techniques of catalysts, known to a person skilled in the art, such as for example: extrusion, coating, drying by atomization or also pelleting.

Water may be added or removed in order to adjust the viscosity of the paste to be extruded. This stage can be carried out at any point in the kneading stage.

In order to adjust the content of solid matter of the paste to be extruded in order to render it extrudable, a compound which is mostly solid can also be added, and preferably an oxide or a hydrate. A hydrate will preferably be used and still more preferably an aluminium hydrate. The volatile solids of this hydrate will be greater than 15%.

The content of acid added during kneading before moulding is less than 30%, preferably comprised between 0.5 and 20% by weight of the anhydrous mass of silica and alumina involved in the synthesis.

The extrusion can be carried out by any conventional tool, available commercially. The paste resulting from the kneading is extruded through a die, for example using a piston or a single-screw or double-screw extruder. This extrusion stage can be carried out by any method known to a person skilled in the art.

The extrudates of support according to the invention generally have a crushing strength of at least 70 N/cm and preferably greater than or equal to 100 N/cm.

Calcination of the Support

The drying is carried by any technique known to a person skilled in the art.

In order to obtain the support of the present invention, it is preferable to calcinate, preferably in the presence of molecular oxygen, for example by flushing with air, at a temperature less than or equal to 1100° C. At least one calcination can be carried out after any one of the preparation stages. This treatment can for example be carried out in a crossed bed or swept bed or in a static atmosphere. For example the oven used can be a turning rotary oven or a vertical oven with radial, transverse layers. The calcination conditions: temperature and duration depend mainly on the maximum temperature of use of the catalyst. The preferred calcination conditions being situated between more than one hour at 200° C. to less than one hour at 1100° C. The calcination can be carried out in the presence of water vapour. The final calcination can optionally be carried out in the presence of an acid or basic vapour. For example, the calcination can be carried out under partial pressure of ammonium hydroxide.

Post-Synthesis Treatments

Post-synthesis treatments can be carried out, in order to improve the properties of the support, in particular its homogeneity as defined previously.

According to the invention, the support can thus optionally be subjected to a hydrothermal treatment in a confined atmosphere. By hydrothermal treatment in an atmosphere is meant a treatment by passing to an autoclave in the presence of water at a temperature above ambient temperature.

During this hydrothermal treatment, the moulded silica-alumina can be treated in different ways. Thus, it is possible to impregnate the silica-alumina with acid, prior to its passage to the autoclave, the autoclaving of the silica-alumina being carried out either in vapour phase, or in liquid phase, this vapour or liquid phase of the autoclave may or may not be acid. This impregnation, prior to the autoclaving can be carried out dry, or by immersion of the silica-alumina in an aqueous acid solution. By dry impregnation is meant bringing the alumina into contact with a volume of solution less than or equal to the total pore volume of the alumina treated. Preferably, the impregnation is carried out dry.

The autoclave is preferably a rotating-basket autoclave as defined in Patent Application EP-A-0 387 109.

The temperature during the autoclaving can be comprised between 100 and 250° C. for a period of time comprised between 30 minutes and 3 hours.

Embodiments of the Invention

The invention is described hereafter in the preferred embodiments and starting from FIGS. 1 to 6.

One embodiment of the invention comprises the following stages:
a) separation of a single "heavy" fraction with an initial boiling point comprised between 120 and 200° C.,
b) hydrotreatment of at least part of said heavy fraction,
c) fractionation into at least three fractions;
   at least one intermediate fraction having an initial boiling point T1 comprised between 120 and 200° C., and a final boiling point T2 greater than 300° C. and less than 410° C.,
   at least one light fraction boiling below the intermediate fraction,
   at least one heavy fraction boiling above the intermediate fraction,
d) passage of at least part of said intermediate fraction into a process according to the invention on a hydroisomerization/hydrocracking non-zeolitic catalyst,
e) passage into a process according to the invention on a hydroisomerization/hydrocracking non-zeolitic catalyst, of at least part of said heavy fraction,
f) distillation of the hydrocracked/hydroisomerized fractions in order to obtain middle distillates, and recycling of the residual fraction boiling above said middle distillates into Stage (e) on the catalyst treating the heavy fraction.

This embodiment will be described with reference to FIG. 1, without FIG. 1 limiting the interpretation.

Stage (a)

The effluent resulting from the Fischer-Tropsch synthesis unit arriving by the duct (1) is fractionated (for example by distillation) in a separation means (2) into at least two fractions: at least one light fraction and one heavy fraction with an initial boiling point equal to a temperature comprised between 120 and 200° C. and preferably between 130 and 180° C. and still more preferably at a temperature of approximately 150° C., in other words the cutting point is situated between 120 and 200° C. The light fraction of FIG. 1 leaves by the duct (3) and the heavy fraction by the duct (4).

This fractionation can be carried out by methods well known to a person skilled in the art, such as flash, distillation etc. As a non-limiting example, the effluent resulting from the Fischer-Tropsch synthesis unit will be subjected to a flash, a decantation in order to eliminate water and a distillation in order to obtain at least the 2 fractions described above.

The light fraction is not treated according to the process of the invention but can for example constitute a good feedstock for petrochemicals and more particularly for a steam-cracking unit (5). The heavy fraction previously described is treated according to the process of the invention.

Stage (b)

This fraction is brought in the presence of hydrogen (duct 6) into a zone (7) containing a hydrotreatment catalyst which has the object of reducing the content of olefinic and unsaturated compounds as well as hydrotreating the oxygenated compounds (alcohols) present in the heavy fraction described above.

The catalysts used in this Stage (b) are hydrotreatment catalysts which are not, or only slightly, cracking, comprising at least one metal of Group VIII and/or Group VI of the periodic table of the elements.

Advantageously, at least one element chosen from P, B, Si is deposited on the support.

These catalysts can be prepared by all the methods known to a person skilled in the art or can be acquired from companies specializing in the manufacture and sale of catalysts.

In the hydrotreatment reactor (7), the feedstock is brought into contact in the presence of hydrogen with the catalyst at operating temperatures and pressures making it possible to carry out hydrodeoxidization (HDO) of the alcohols and hydrogenation of the olefins present in the feedstock. The reaction temperatures used in the hydrotreatment reactor are comprised between 100 and 350° C., preferably between 150 and 300° C., more preferably between 150 and 275° C., and better still between 175 and 250° C. The total pressure range used varies from 5 to 150 bar, preferably between 10 and 100 bar and still more preferably between 10 and 90 bar. The hydrogen which feeds the hydrotreatment reactor is introduced at a flow rate such that the hydrogen/hydrocarbon volume ratio is comprised between 100 and 3000 Nl/l/h, preferably between 100 and 2000 Nl/l/h, and still more preferably between 250 and 1500 Nl/l/h. The feedstock flow rate is such that the hourly volume rate is comprised between 0.1 and 10 $h^{-1}$, preferably between 0.2 and 5 $h^{-1}$ and still more preferably between 0.2 and 3 $h^{-1}$. Under these conditions, the content of unsaturated and oxygenated molecules is reduced to less than 0.5% and to approximately less than 0.1% in general. The hydrotreatment stage is carried out under conditions such that the conversion into products having boiling points greater than or equal to 370° C., into products having boiling points below 370° C. is limited to 30% by weight, preferably less than 20% and still more preferably is less than 10%.

Stage (c)

The effluent resulting from the hydrotreatment reactor is conveyed by a duct (8) into a fractionating zone (9) where it is fractionated into at least three fractions.

at least one light fraction (leaving by the duct 10), the constituent compounds of which have boiling points below a temperature T1 comprised between 120 and 200° C. and preferably between 130 and 180° C. and still more preferably at a temperature of approximately 150° C., in other words the cutting point is situated between 120 and 200° C.
   at least one intermediate fraction (duct 11), comprising compounds the boiling points of which are comprised between the cutting point T1, previously defined, and a temperature T2 above 300° C., still more preferably above 350° C., and below 410° C., or better 370° C.
   at least one "heavy" fraction (duct 12), comprising compounds having boiling points above the cutting point T2 previously defined.

The fractionation is obtained here by distillation, but it can be carried out in one or more stages and by means other than distillation.

This fractionation can be carried out by methods well known to a person skilled in the art, such as flash, distillation etc.

The intermediate and heavy fractions previously described are treated according to the process of the invention.

Stage (d)

At least part of said intermediate fraction is then introduced (duct 11), as well as optionally a flow of hydrogen (duct 13) into the zone (14) containing the hydroisomerization/hydrocracking catalyst of the process according to the present invention.

The operating conditions under which this Stage (d) is carried out are:

The pressure is maintained between 2 and 150 bar and preferably between 5 and 100 bar and advantageously from 10 to 90 bar, the space velocity is comprised between 0.1 $h^{-1}$ and 10 $h^{-1}$ and preferably between 0.2 $h^{-1}$ and 7 $h^{-1}$, is advantageously between 0.5 $h^{-1}$ and 5.0 $h^{-1}$. The hydrogen rate is comprised between 100 and 2000 Normal litres of hydrogen per litre of feedstock and per hour and preferentially between 150 and 1500 litres of hydrogen per litre of feedstock.

The temperature used in this stage is comprised between 200 and 450° C. and preferentially from 250° C. to 450° C., advantageously from 300° C. to 450° C., and still more advantageously above 320° C. or for example between 320 and 420° C.

The Stage (d) of hydroisomerization and hydrocracking is advantageously carried out under conditions such that the conversion via products with boiling points above or equal to 150° C., into products having boiling points below 150° C. is as low as possible, preferably below 50%, still more preferably below 30% and makes it possible to obtain middle distillates (diesel oil and kerosene) having cold properties (pour point and freezing point) good enough to satisfy the specifications in force for this type of fuel.

Thus in this Stage (d), it is endeavoured to promote hydroisomerization rather than hydrocracking.

Stage (e)

At least part of said heavy fraction is introduced via the line (12) into a zone (15) where it is brought, in the presence of hydrogen (25), into contact with a hydroisomerization/hydrocracking catalyst according to the process of the present invention in order to produce a middle distillate cut (kerosene+diesel oil) having good cold properties.

The catalyst used in the zone (15) of Stage (e) in order to carry out the hydrocracking and hydroisomerization reactions of the heavy fraction, defined according to the invention, is of the same type as that present in the reactor (14). However, it should be noted that the catalysts used in the reactors (14) and (15) can be identical or different.

During this Stage (e) the fraction entering the reactor is subjected, in contact with the catalyst and in the presence of hydrogen essentially to hydrocracking reactions which, accompanied by hydroisomerization reactions of the n-paraffins, will make it possible to improve the quality of the products formed and more particularly the cold properties of the kerosene and diesel oil, and also to obtain very good yields of distillates. The conversion into products having boiling points higher than or equal to 370° C., into products with boiling points lower than 370° C. is greater than 80% by weight, often at least 85% and preferably greater than or equal to 88%. In contrast, the conversions of the products with boiling points higher than or equal to 260° C., into products with boiling points lower than 260° C. is greater than 90% by weight, generally at least 70% or 80% and preferably at most 60% by weight.

Stage (f)

The effluents leaving the reactors (14) and (15) are conveyed by the ducts (16) and (17) into a distillation train, which combines an atmospheric distillation and optionally a distillation under vacuum, and which has the object of separating on the one hand the light products inevitably formed during Stages (d) and (e) for example the ($C_1$-$C_4$) gases (duct 18) and a gasoline cut (duct 19), and distilling at least one diesel oil (duct 21) and kerosene (duct 20) cut. The diesel oil and kerosene fractions can be recycled (duct 23) in part, jointly or separately, to the head of the hydroisomerization/hydrocracking reactor (14), Stage (d).

A fraction is also distilled (duct 22) boiling above diesel oil, i.e. the compounds which constitute it have boiling points above those of the middle distillates (kerosene+diesel oil). This fraction, the "residual" fraction, generally has an initial boiling point of at least 350° C., preferably above 370° C. This fraction is advantageously recycled to the head of the reactor (15) via the duct (26) of hydroisomerization/hydrocracking of the heavy fraction (Stage e).

It can also be advantageous to recycle part of the kerosene and/or diesel oil into Stage (d), Stage (e) or both. Preferably, at least one of the kerosene and/or diesel oil fractions is partly recycled into Stage (d) (zone 14). It has been noted that it is advantageous to recycle part of the kerosene in order to improve its cold properties.

Advantageously and at the same time, the non-hydrocracked fraction is partly recycled into Stage (e) (zone 15).

It goes without saying that the diesel oil and kerosene cuts are preferably recovered separately, but the cutting points are adjusted by the operator as required.

In FIG. 1, a distillation column (24) is represented, but two columns can be used in order to separately treat the cuts resulting from zones (14) and (15).

In FIG. 1, only the recycling of kerosene is represented on the reactor catalyst (14). It goes without saying that part of the diesel oil can also be recycled (separately or with the kerosene) and preferably on the same catalyst as the kerosene.

Another embodiment of the invention comprises the following stages:

a) separation of at least one light fraction of the feedstock in order to obtain a single "heavy" fraction, with an initial boiling point between 120-200° C., b) optional hydrotreatment of said heavy fraction, optionally followed by a stage c) of removal of at least part of the water, d) passage into a process according to the invention of at least part of said fraction optionally hydrotreated, the conversion on the hydroisomerization/hydrocracking catalyst of the products with boiling points above or equal to 370° C., into products with boiling points below 370° C. is greater than 80% by weight.

e) distillation of the hydrocracked/hydroisomerized fraction in order to obtain middle distillates, and recycling into Stage (d) of the residual fraction boiling above said middle distillates.

The description of this embodiment will be given with reference to FIG. 2, without FIG. 2 limiting the interpretation.

Stage (a)

The effluent resulting from the Fischer-Tropsch synthesis unit arriving by the duct (1) is fractionated (for example by distillation) in a separation means (2) into at least two fractions: at least one light fraction and one heavy fraction with an initial boiling point equal to a temperature comprised between 120 and 200° C. and preferably between 130 and 180° C. and still more preferably at a temperature of approximately 150° C., in other words the cutting point is situated between 120 and 200° C. The light fraction of FIG. 1 leaves by the duct (3) and the heavy fraction by the duct (4).

This fractionation can be carried out by methods well known to a person skilled in the art, such as flash, distillation etc.

The light fraction is not treated according to the process of the invention but can for example constitute a good feedstock for petrochemicals and more particularly for a steam-cracking unit (5). The heavy fraction previously described is treated according to the process of the invention.

Stage (b)

Optionally, this fraction is brought in the presence of hydrogen (duct 6) into a zone (7) containing a hydrotreatment catalyst which has the object of reducing the content of olefinic and unsaturated compounds as well as hydrotreating the oxygenated compounds (alcohols) present in the heavy fraction described above.

The catalysts used in this Stage (b) are hydrotreatment catalysts which are not, or only slightly, cracking, comprising at least one metal of Group VIII and/or Group VI of the periodic table of the elements.

Advantageously, at least one element chosen from P, B, Si is deposited on the support.

These catalysts can be prepared by all the methods known to a person skilled in the art or can be acquired from companies specializing in the manufacture and sale of catalysts.

In the hydrotreatment reactor (7), the feedstock is brought into contact in the presence of hydrogen with the catalyst at operating temperatures and pressures making it possible to carry out hydrodeoxidization (HDO) of the alcohols and hydrogenation of the olefins present in the feedstock. The reaction temperatures used in the hydrotreatment reactor are comprised between 100 and 350° C., preferably between 150 and 300° C., more preferably between 150 and 275° C., and better still between 175 and 250° C. The total pressure range used varies from 5 to 150 bar, preferably between 10 and 100 bar and still more preferably between 10 and 90 bar. The hydrogen which feeds the hydrotreatment reactor is introduced at a flow rate such that the hydrogen/hydrocarbon volume ratio is comprised between 100 and 3000 Nl/l/h, preferably between 100 and 2000 Nl/l/h, and still more preferably between 250 and 1500 Nl/l/h. The feedstock flow rate is such that the hourly volume rate is comprised between 0.1 and 10 $h^{-1}$, preferably between 0.2 and 5 $h^{-1}$ and still more preferably between 0.2 and 3 $h^{-1}$. Under these conditions, the content of unsaturated and oxygenated molecules is reduced to less than 0.5% and to approximately less than 0.1% in general. The hydrotreatment stage is carried out under conditions such that the conversion into products having boiling points greater than or equal to 370° C., into products having boiling points below 370° C. is limited to 30% by weight, preferably less than 20% and still more preferably is less than 10%.

Stage (c)

The effluent (duct 8) resulting from the hydrotreatment reactor (7) is optionally introduced into a zone (9) for removal of water which has the object of eliminating at least part of the water produced during the hydrotreatment reactions. This elimination of water can be carried out with or without elimination of the $C_4$ minus gaseous fraction, which is generally produced during the hydrotreatment stage. By elimination of water is meant the elimination of the water produced by the hydrodeoxygenation (HDO) reactions of the alcohols, but it can also include the elimination of at least part of the water of saturation of the hydrocarbons. The elimination of the water can be carried out by any methods and techniques known to a person skilled in the art, for example drying, passing over a desiccant, flash, decantation etc.

Stage (d)

The heavy fraction (optionally hydrotreated) thus dried is then introduced (duct 10) as well as optionally a flow of hydrogen (duct 11) into the zone (12) containing the hydroisomerization/hydrocracking catalyst. Another possibility of the process according to the invention consists of sending all the effluent leaving the hydrotreatment reactor (without drying) into the reactor containing the hydroisomerization/hydrocracking catalyst and preferably at the same time as a flow of hydrogen.

Before use in the reaction, the metal contained in the catalyst must be reduced. One of the preferred methods for carrying out reduction of the metal is treatment under hydrogen at a temperature comprised between 150° C. and 160° C. and a total pressure comprised between 0.1 and 25 Mpa. For example, a reduction consists of a plateau at 150° C. of 2 hours then a rise in temperature to 450° C. at the rate of 1° C./minute then a plateau of 2 hours at 450° C.: throughout this reduction stage, the hydrogen flow rate is 1000 litres of hydrogen/litre of catalyst. It should also be noted that any ex situ reduction method is suitable.

The operating conditions under which this Stage (d) is carried out are:

The pressure is maintained between 2 and 150 bar and preferably between 5 and 100 bar and advantageously from 10 to 90 bar, the space velocity is comprised between 0.1 $h^{-1}$ and 10 h-1 and preferably between 0.2 $h^{-1}$ and 7 $h^{-1}$, is advantageously between 0.5 $h^{-1}$ and 5.0 $h^{-1}$. The hydrogen rate is comprised between 100 and 2000 Normal litres of hydrogen per litre of feedstock and per hour and preferentially between 150 and 1500 litres of hydrogen per litre of feedstock.

The temperature used in this stage is comprised between 200 and 450° C. and preferentially from 250° C. to 450° C., advantageously from 300° C. to 450° C., and still more advantageously above 320° C. or for example between 320 and 420° C.

The stage of hydroisomerization and hydrocracking is advantageously carried out under conditions such that the conversion via products with boiling points above or equal to 370° C., into products having boiling points below 370° C. is greater than 80% by weight, and still more preferably at least 85%, preferably above 88%, in order to obtain middle distillates (diesel oil and kerosene) having cold properties (pour point and freezing point) good enough to satisfy the specifications in force for this type of fuel.

The two stages, hydrotreatment and hydroisomerization-hydrocracking can be carried out on both types of catalyst in two or more different reactors, and/or in the same reactor.

Stage (e)

The effluent (hydrocracked/hydroisomerized fraction) leaving the reactor (12), Stage (d), is sent into a distillation train (13), which combines an atmospheric distillation and optionally a distillation under vacuum, which has the object of separating the conversion products boiling below 340° C. and preferably below 370° C. and including in particular those formed during Stage (d) in the reactor (12), and separating the residual fraction, the initial boiling point of which is generally above at least 340° C. and preferably above or equal to 370° C. Among the conversion and hydroisomerized products, apart from the light $C_1$-$C_4$ gases (duct 14), at least one gasoline fraction (duct 15), and at least one kerosene (duct 16) and diesel oil (duct 17) middle distillate fraction are separated. The residual fraction, the initial boiling point of which is generally above at least 340° C. and preferably above or equal to at least 370° C. is recycled (duct 18), to the head of the hydroisomerization/hydrocracking reactor (12).

It can also be advantageous to recycle (duct 19) to Stage (d) (reactor 12) part of the kerosene and/or diesel oil thus obtained.

Another embodiment of the invention comprises the following stages:
a) Fractionation (Stage a) of the feedstock into at least 3 fractions:
   at least one intermediate fraction having an initial boiling point T1 comprised between 120 and 200° C., and a final boiling point T2 greater than 300° C. and less than 410° C.,
   at least one light fraction boiling below the intermediate fraction,
   at least one heavy fraction boiling above the intermediate fraction,
b) Hydrotreatment (Stage b) of at least part of said intermediate fraction, then passage (Stage d) into a process of treatment of at least part of the hydrotreated fraction on a hydroisomerization/hydrocracking catalyst,
f) Passage (Stage f) into a process of treatment of at least part of said heavy fraction on a hydroisomerization/hydrocracking catalyst, with conversion of the 370° C.$^+$ products to products below 370° C., greater than 80% by weight.
e and g) Distillation (Stages e and g) of at least part of the hydrocracked/hydroisomerized fractions in order to obtain middle distillates, and at least one of said treatment processes of Stages d) and f) is the process of the invention.

This embodiment will be described with reference to FIG. 3, without FIG. 3 limiting the interpretation.

Stage (a)

The effluent resulting from the Fischer-Tropsch synthesis unit arriving by the duct (1) is fractionated in a fractionation zone (2) into at least three fractions:
   at least one light fraction (leaving by the duct 3), the constituent compounds of which have boiling points below a temperature T1 comprised between 120 and 200° C. and preferably between 130 and 180° C. and still more preferably at a temperature of approximately 150° C., in other words the cutting point is situated between 120 and 200° C.
   at least one intermediate fraction (duct 4), comprising compounds the boiling points of which are comprised between the cutting point T1, previously defined, and a temperature T2 above 300° C., still more preferably above 350° C., and below 410° C., or better 370° C.
   at least one "heavy" fraction (duct 5), comprising compounds having boiling points above the cutting point T2 previously defined.

A cut between a boiling point T1 comprised between 120 and 200° C. and T2 above 300° C. and below 370° C. is preferred. The 370° C. cut is still more preferred, i.e. the heavy fraction is a 370° C.+ cut.

The fact of cutting at 370° C. makes it possible to separate at least 90% by weight of the oxygenated products and olefins, and most often at least 95% by weight. The heavy cut to be treated is then purified and elimination of the heteroatoms or unsaturated products by hydrotreatment is not then necessary.

The fractionation is obtained here by distillation, but it can be carried out in one or more stages and by means other than distillation.

This fractionation can be carried out by methods well known to a person skilled in the art such as flash, distillation etc.

The light fraction is not treated according to the process of the invention but can for example constitute a good feedstock for a petrochemical unit and more particularly for a steam cracker (steam cracking installation 6).

The heavier fractions previously described are treated according to the process of the invention.

Stage (b)

Said intermediate fraction is introduced via the line (4), in the presence of hydrogen supplied by the tubing (7), into a hydrotreatment zone (8) containing a hydrotreatment catalyst. The object of this hydrotreatment is to reduce the content of olefinic and unsaturated compounds as well as to hydrotreat the oxygenated compounds (alcohols) present.

The catalysts used in this Stage (b) are hydrotreatment catalysts which are not, or only slightly, cracking, comprising at least one metal of Group VIII and/or Group VI of the periodic table of the elements.

Advantageously, at least one element chosen from P, B, Si is deposited on the support.

These catalysts can be prepared by all the methods known to a person skilled in the art or can be acquired from companies specializing in the manufacture and sale of catalysts.

In the hydrotreatment reactor (8), the feedstock is brought into contact in the presence of hydrogen with the catalyst at operating temperatures and pressures making it possible to carry out hydrodeoxygenation (HDO) of the alcohols and hydrogenation of the olefins present in the feedstock. The reaction temperatures used in the hydrotreatment reactor are comprised between 100 and 350, preferably between 150 and 300° C., still more preferably between 150 and 275° C., and better still between 175 and 250° C. The total pressure range used varies from 5 to 150 bar, preferably between 10 and 100 bar and still more preferably between 10 and 90 bar. The hydrogen which feeds the hydrotreatment reactor is introduced at a flow rate such that the hydrogen/hydrocarbon volume ratio is comprised between 100 and 3000 Nl/l/h, preferably between 100 and 2000 Nl/l/h, and still more preferably between 250 and 1500 Nl/l/h. The feedstock flow rate is such that the hourly volume rate is comprised between 0.1 and 10 $h^{-1}$, preferably between 0.2 and 5 h–1 and still more preferably between 0.2 and 3 $h^{-1}$. Under these conditions, the content of unsaturated and oxygenated molecules is reduced to less than 0.5% and to approximately less than 0.1% in general. The hydrotreatment stage is carried out under conditions such that the conversion into products having boiling points greater than or equal to 370° C., into products having boiling points below 370° C. is limited to 30% by weight, preferably less than 20% and still more preferably is less than 10%.

Stage (c)

The effluent (duct 8) resulting from the hydrotreatment reactor is optionally introduced into a zone (9) for removal of water which has the object of eliminating at least part of the water produced during the hydrotreatment reactions. This elimination of water can be carried out with or without elimination of the $C_4$ minus gaseous fraction, which is generally produced during the hydrotreatment stage. By elimination of water is meant the elimination of the water produced by the hydrodeoxygenation (HDO) reactions of the alcohols, but it can also include the elimination of at least part of the water of saturation of the hydrocarbons. The elimination of the water can be carried out by any methods and techniques known to a person skilled in the art, for example drying, passing over a desiccant, flash, decantation etc.

Stage (d)

The fraction thus optionally dried is then introduced (duct 10) as well as optionally a flow of hydrogen (duct 11) into the zone (12) containing the hydroisomerization/hydrocracking catalyst. Another possibility of the process according to the invention consists of sending all the effluent leaving the hydrotreatment reactor (without drying) into the reactor containing the hydroisomerization/hydrocracking catalyst and preferably at the same time as a flow of hydrogen.

The operating conditions under which this Stage (d) is carried out are:

The pressure is maintained between 2 and 150 bar and preferably between 5 and 100 bar and advantageously from 10 to 90 bar, the space velocity is comprised between 0.1 $h^{-1}$ and 10 $h^{-1}$ and preferably between 0.2 $h^{-1}$ and 7 $h^{-1}$, is advantageously between 0.5 $h^{-1}$ and 5.0 $h^{-1}$. The hydrogen rate is comprised between 100 and 2000 Normal litres of hydrogen per litre of feedstock and per hour and preferentially between 150 and 1500 litres of hydrogen per litre of feedstock.

The temperature used in this stage is comprised between 200 and 450° C. and preferentially from 250° C. to 450° C., advantageously from 300° C. t0 450° C., and still more advantageously above 320° C. or for example between 320 and 420° C.

The two stages, hydrotreatment and hydroisomerization-hydrocracking can be carried out on both types of catalyst in two or more different reactors, and/or in the same reactor.

The Stage (d) of hydroisomerization and hydrocracking is advantageously carried out under conditions such that the conversion via products with boiling points above or equal to 150° C., into products having boiling points below 150° C. is as low as possible, preferably below 50%, still more preferably below 30% and makes it possible to obtain middle distillates (diesel oil and kerosene) having cold properties (pour point and freezing point) good enough to satisfy the specifications in force for this type of fuel.

Thus in this Stage (d), it is endeavoured to promote hydroisomerization rather than hydrocracking.

Stage (f)

Said heavy fraction, the boiling points of which are higher than the cutting point T2, previously defined, is introduced via the line (5) into a zone (13) where it is brought, in the presence of hydrogen (26), into contact with a hydroisomerization/hydrocracking non-zeolitic catalyst in order to produce a middle distillate cut (kerosene+diesel oil) having good cold properties.

The catalyst used in the zone (13) of Stage (f) in order to carry out the hydrocracking and hydroisomerization reactions of the heavy fraction, defined according to the invention, is of the same type as that present in the reactor (12). However, it should be noted that the catalysts used in the reactors (12) and (13) can be identical or different.

During this Stage (e) the fraction entering the reactor is subjected, in contact with the catalyst and in the presence of hydrogen essentially to hydrocracking reactions which, accompanied by hydroisomerization reactions of the n-paraffins, will make it possible to improve the quality of the products formed and more particularly the cold properties of the kerosene and diesel oil, and also to obtain very good yields of distillates. The conversion into products having boiling points higher than or equal to 370° C., into products with boiling points lower than 370° C. is greater than 80% by weight, often at least 85% and preferably greater than or equal to 88%. In contrast, the conversions of the products with boiling points higher than or equal to 260° C., into products with boiling points lower than 260° C. is greater than 90% by weight, generally at least 70% or 80% and preferably at most 60% by weight.

In this Stage (f), it is therefore endeavoured to promote hydrocracking, but preferably limiting the cracking of the diesel oil.

Stage (g)

The effluent leaving the reactor (12), Stage (d), is sent into a distillation train, which combines an atmospheric distillation and optionally a distillation under vacuum, which has the object of separating on the one hand the light products inevitably formed during Stage (d) for example the ($C_1$-$C_4$) gases (duct 14) and a gasoline cut (duct 19), and distilling at least one diesel oil (duct 17) and kerosene (duct 16) cut. The diesel oil and kerosene fractions can be recycled (duct 25) in part, jointly or separately, to the head of the hydroisomerization/hydrocracking reactor (12), Stage (d).

The effluent leaving Stage (f) is subjected to separation in a distillation train, in order to separate on the one hand the light products inevitably formed during Stage (f) for example the ($C_1$-$C_4$) gases (duct 18) and a gasoline cut (duct 19), to distil a diesel oil (duct 21) and kerosene (duct 20) cut and to distil the fraction (duct 22) boiling above the diesel oil, i.e. the compounds which constitute it have boiling points above those of the middle distillates (kerosene+diesel oil). This fraction, the "residual" fraction, generally has an initial boiling point of at least 350° C., preferably above 370° C. This non-hydrocracked fraction is advantageously recycled to the head of the hydroisomerization/hydrocracking reactor (duct 13), Stage (f).

It can also be advantageous to recycle part of the kerosene and/or diesel oil into Stage (d), Stage (f) or both. Preferably, at least one of the kerosene and/or diesel oil fractions is partly recycled (duct 25) into Stage (d) (zone 12). It has been noted that it is advantageous to recycle part of the kerosene in order to improve its cold properties.

Advantageously and at the same time, the non-hydrocracked fraction is partly recycled into Stage (f) (zone 13).

It goes without saying that the diesel oil and kerosene cuts are preferably recovered separately, but the cutting points are adjusted by the operator as required.

In FIG. 3, two distillation columns (23) and (24) are represented, but one column can be used in order to treat all the cuts resulting from zones (12) and (13).

In FIG. 3, only the recycling of kerosene is represented, on the reactor catalyst (12). It goes without saying that part of the diesel oil can also be recycled (separately or with the kerosene) and preferably on the same catalyst as the kerosene. Part of the kerosene and/or diesel oil produced in the lines (20) (21) can also be recycled.

Another embodiment of the invention comprises the following stages:

a) optional fractionation of the feedstock into at least one heavy fraction with an initial boiling point comprised between 120 and 200° C., and at least one light fraction boiling below said heavy fraction, b) optional hydrotreatment of at least part of the feedstock or the heavy fraction, optionally followed by a Stage c)
c) elimination of at least part of the water,
d) passage of at least part of the optionally hydrotreated effluent or fraction into a treatment process on a first hydroisomerization/hydrocracking catalyst containing at least one noble metal of Group VIII,
e) distillation of the hydroisomerized/hydrocracked effluent in order to obtain middle distillates (kerosene, diesel oil) and a residual fraction boiling above the middle distillates,
f) on a second hydroisomerization/hydrocracking catalyst containing at least one noble metal of Group VIII, passage into a treatment process of at least part of said residual heavy fraction and/or part of said middle distillates and distillation of the resultant effluent in order to obtain middle distillates, and at least one of said treatment processes of Stages d) and f) is that of the invention.

This embodiment will be described with reference to FIGS. 4 and 5, without these figures limiting the interpretation.

Stage a)

When this stage is used, the effluent resulting from the Fischer-Tropsch synthesis unit is fractionated (for example by distillation) into at least two fractions: at least one light fraction and at least one heavy fraction with an initial boiling point equal to a temperature comprised between 120 and 200° C. and preferably between 130 and 180° C. and still more preferably at a temperature of approximately 150° C., in other words the cutting point is situated between 120 and 200° C.

The heavy fraction generally has paraffin contents of at least 50% by weight.

This fractionation can be carried out by methods well known to a person skilled in the art, such as flash, distillation etc. As a non-limiting example, the effluent resulting from the Fischer-Tropsch synthesis unit will be subjected to a flash, a decantation in order to eliminate water and a distillation in order to obtain at least the 2 fractions described above.

The light fraction is not treated according to the process of the invention but can for example constitute a good feedstock for petrochemicals and more particularly for a steam-cracking unit. At least one heavy fraction previously described is treated according to the process of the invention.

Stage (b)

Optionally, this fraction or at least part of the initial feedstock is brought via the line (1) in the presence of hydrogen (supplied by the duct (2)) into a zone (3) containing a hydrotreatment catalyst which has the object of reducing the content of olefinic and unsaturated compounds as well as hydrotreating the oxygenated compounds (alcohols) present in the heavy fraction described above.

The catalysts used in this Stage (b) are hydrotreatment catalysts which are not, or only slightly, cracking, comprising at least one metal of Group VIII and/or Group VI of the periodic table of the elements.

Advantageously, at least one element chosen from P, B, Si is deposited on the support.

These catalysts can be prepared by all the methods known to a person skilled in the art or can be acquired from companies specializing in the manufacture and sale of catalysts.

In the hydrotreatment reactor (3), the feedstock is brought into contact in the presence of hydrogen with the catalyst at operating temperatures and pressures making it possible to carry out hydrodeoxygenation (HDO) of the alcohols and hydrogenation of the olefins present in the feedstock. The reaction temperatures used in the hydrotreatment reactor are comprised between 100 and 350, preferably between 150 and 300° C., more preferably between 150 and 275° C., and better still between 175 and 250° C. The total pressure range used varies from 5 to 150 bar, preferably between 10 and 100 bar and still more preferably between 10 and 90 bar. The hydrogen which feeds the hydrotreatment reactor is introduced at a flow rate such that the hydrogen/hydrocarbon volume ratio is comprised between 100 and 3000 Nl/l/h, preferably between 100 and 2000 Nl/l/h, and still more preferably between 250 and 1500 Nl/l/h. The feedstock flow rate is such that the hourly volume rate is comprised between 0.1 and 10 h$^{-1}$, preferably between 0.2 and 5 h$^{-1}$ and still more preferably between 0.2 and 3 h$^{-1}$. Under these conditions, the content of unsaturated and oxygenated molecules is reduced to less than 0.5% and to approximately less than 0.1% in general. The hydrotreatment stage is carried out under conditions such that the conversion into products having boiling points greater than or equal to 370° C., into products having boiling points below 370° C. is limited to 30% by weight, preferably less than 20% and still more preferably is less than 10%.

Stage (c)

The effluent (duct 4) resulting from the hydrotreatment reactor (3) is optionally introduced into a zone (5) for removal of water which has the object of eliminating at least part of the water produced during the hydrotreatment reactions. This elimination of water can be carried out with or without elimination of the $C_4$ minus gaseous fraction, which is generally produced during the hydrotreatment stage. By elimination of water is meant the elimination of the water produced by the hydrodeoxygenation (HDO) reactions of the alcohols, but it can also include the elimination of at least part of the water of saturation of the hydrocarbons. The elimination of the water can be carried out by any methods and techniques known to a person skilled in the art, for example drying, passing over a desiccant, flash, decantation etc.

Stage (d)

At least part and preferably all of the hydrocarbon fraction (at least part of the feedstock or at least part of the heavy fraction of Stage a) or at least part of the hydrotreated and optionally dried fraction or feedstock) is then introduced (duct 6) as well as optionally a flow of hydrogen (duct 7) into the zone (8) containing said first hydroisomerization/hydrocracking catalyst. Another possibility of the process also according to the invention consists of sending part or all of the effluent leaving the hydrotreatment reactor (without drying) into the reactor containing the hydroisomerization/hydrocracking catalyst and preferably at the same time as a flow of hydrogen.

Before use in the reaction, the metal contained in the catalyst must be reduced. One of the preferred methods for carrying out reduction of the metal is treatment under hydrogen at a temperature comprised between 150° C. and 650° C. and a total pressure comprised between 0.1 and 25 Mpa. For example, a reduction consists of a plateau at 150° C. of 2 hours then a rise in temperature to 450° C. at the rate of 1° C./minute then a plateau of 2 hours at 450° C.: throughout this reduction stage, the hydrogen flow rate is 1000 litres of hydrogen/litre of catalyst. It should also be noted that any ex situ reduction method is suitable.

The operating conditions under which this Stage (d) is carried out are:

The pressure is maintained between 2 and 150 bar and preferably between 5 and 100 bar and advantageously from 10 to 90 bar, the space velocity is comprised between 0.1 h$^{-1}$ and 10 h$^{-1}$ and preferably between 0.2 h$^{-1}$ and 7 h$^{-1}$, is advantageously between 0.5 h$^{-1}$ and 5.0 h$^{-1}$. The hydrogen rate is comprised between 100 and 2000 Normal litres of hydrogen per litre of feedstock and per hour and preferentially between 150 and 1500 litres of hydrogen per litre of feedstock.

The temperature used in this stage is comprised between 200 and 450° C. and preferentially from 250° C. to 450° C., advantageously from 300° C. to 450° C., and still more advantageously above 320° C. or for example between 320 and 420° C.

The two stages, hydrotreatment and hydroisomerization-hydrocracking can be carried out on both types of catalyst in two or more different reactors, and/or in the same reactor.

Stage e)

The hydroisomerized/hydrocracked effluent leaving the reactor (8), Stage (d), is sent into a distillation train (9), which combines an atmospheric distillation and optionally a distillation under vacuum, which has the object of separating the conversion products boiling below 340° C. and preferably below 370° C. and including in particular those formed during Stage (d) in the reactor (8), and separating the residual fraction, the initial boiling point of which is generally above at least 340° C. and preferably above or equal to 370° C. Among the conversion and hydroisomerized products, apart from the light $C_1$-$C_4$ gases (duct 10), at least one gasoline fraction (duct 11), and at least one kerosene (duct 12) and diesel oil (duct 13) middle distillate fraction are separated.

Stage f)

The process according to the invention uses a second zone (16) containing a hydroisomerization/hydrocracking catalyst ("second" catalyst). Over this catalyst, in the presence of hydrogen (duct 15) is passed an effluent chosen from part of the kerosene produced (duct 12), part of the diesel oil (duct 13) and the residual fraction and preferably, the residual fraction the initial boiling point of which is generally above at least 370° C.

The catalyst present in the reactor (16) of Stage (f) of the process according to the invention is, in the same way as for Stage (d), of non-zeolitic acid type and based on at least one noble metal of Group VIII; however it can be identical to or different from that of Stage (d).

During this stage the fraction entering the reactor (16) is subjected, in contact with the catalyst and in the presence of hydrogen, to hydroisomerization and/or hydrocracking reactions which will make it possible to improve the quality of the products formed and more particularly the cold properties of the kerosene and diesel oil, and to obtain improved distillate yields compared with the prior art.

The choice of the operating conditions allows fine adjustment of the quality of the products (middle distillates) and in particular the cold properties.

The operating conditions under which this Stage (f) is carried out are:

The pressure is maintained between 2 and 150 bar and preferably between 5 and 100 bar and advantageously from 10 to 90 bar, the space velocity is comprised between 0.1 h$^{-1}$ and 10 h$^{-1}$ and preferably between 0.2 h$^{-1}$ and 7 h$^{-1}$, is advantageously between 0.5 h$^{-1}$ and 5.0 h$^{-1}$. The hydrogen rate is comprised between 100 and 2000 Normal litres of hydrogen per litre of feedstock and per hour and preferentially between 150 and 1500 litres of hydrogen per litre of feedstock.

The temperature used in this stage is comprised between 200 and 450° C. and preferentially from 250° C. to 450° C., advantageously from 300° C. to 450° C., and still more advantageously above 320° C. or for example between 320 and 420° C.

The operator will adjust the operating conditions on the first and second hydroisomerization/hydrocracking catalyst in order to obtain the desired qualities of products and yields.

Thus, generally, on the first catalyst, the conversion via products with boiling points above or equal to 150° C., into products with boiling points below 150° C. is below 50%, preferably below 30% by weight. These conditions make it possible in particular to adjust the ratio of kerosene/diesel oil products, as well as the cold products of the middle distillates, and more particularly of the kerosene.

Also generally, on the second catalyst, when the residual fraction is treated, the conversion via products with boiling points above or equal to 370° C., into products having boiling points below 370° C. is greater than 40% by weight, preferably greater than 50% by weight, or, better, 60% by weight. It can even prove advantageous to have conversions of at least 80% by weight.

When part of the kerosene and/or diesel oil is treated on the second catalyst, the conversion via products with boiling points above or equal to 150° C., into products with boiling points below 150° C. is below 50%, preferably below 30% by weight.

Generally the operating conditions used in the reactors (8) and (16) can be different or identical. Preferably, the operating conditions used in the two hydroisomerization/hydrocracking reactors are chosen different in terms of operating pressure, temperature, contact time (vvh) and H$_2$/feedstock ratio. This embodiment allows the operator to adjust the qualities and/or yields of the kerosene and diesel oil.

The effluent resulting from the reactor (16) is then sent via the line (17) into the distillation train in order to separate the conversion products, gasoline, kerosene and diesel oil.

Figure 4:
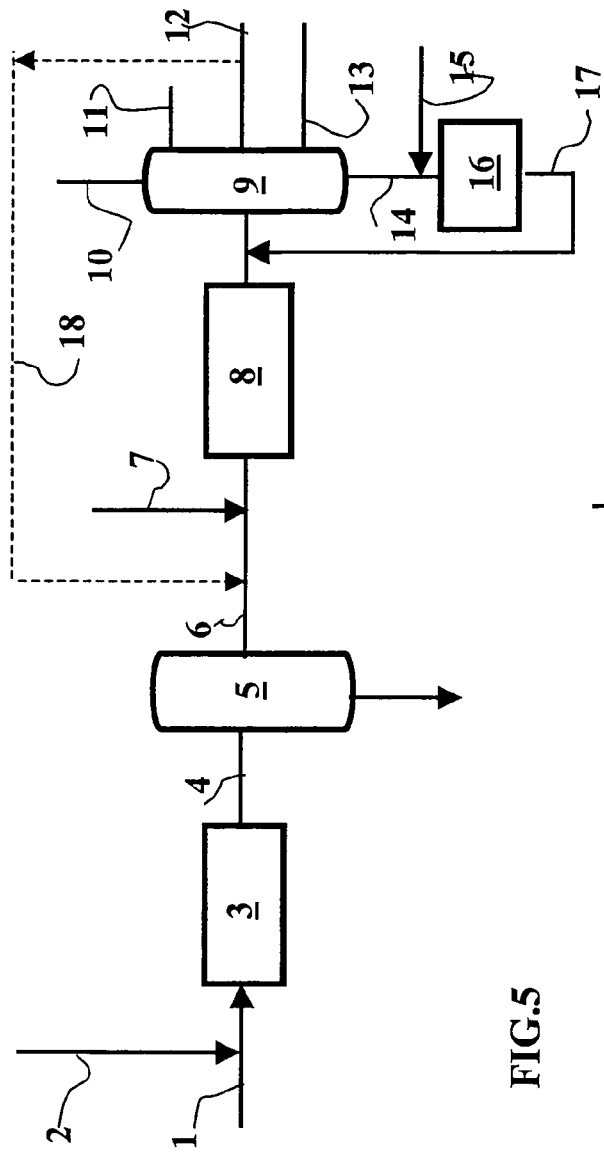
FIG. 4: Schematic diagram of the process according to a fourth embodiment of invention.

In FIG. 4, an embodiment is represented with the residual fraction (duct 14) passing into the hydroisomerization/hydrocracking zone (16), (Stage f), the effluent obtained being sent (duct 17) into the separation zone (9).

Advantageously at the same time the kerosene and/or the diesel oil can be partly recycled (duct 18) into the hydroisomerization/hydrocracking zone (8) (stage d) on the first catalyst.

Figure 5:
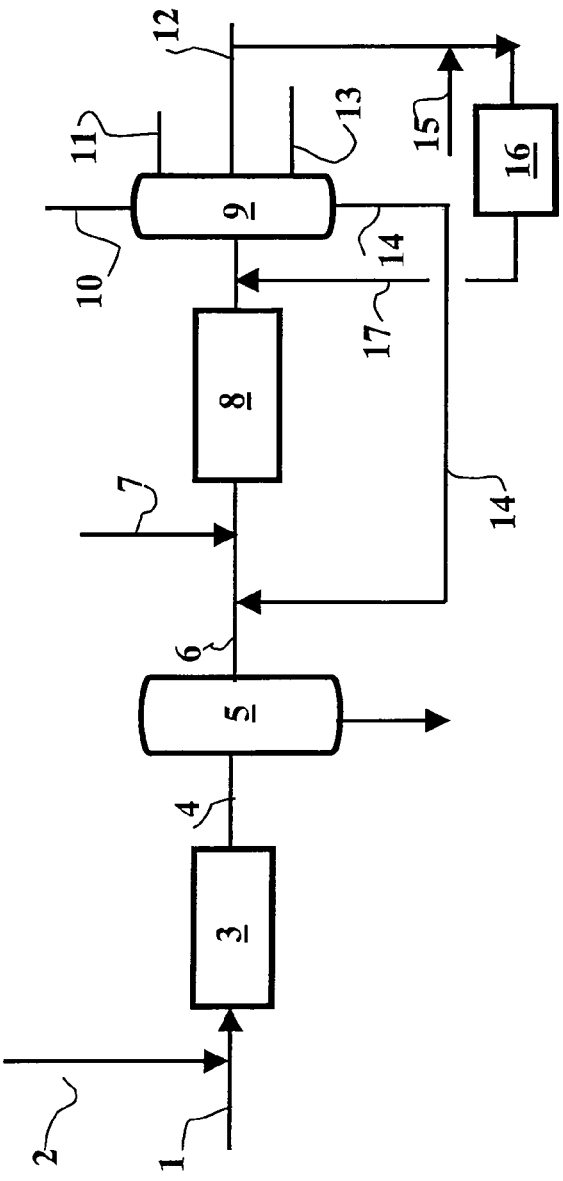
FIG. 5: Schematic diagram of the process according to fifth embodiment of invention.

In FIG. 5, part of the kerosene and/or diesel oil produced passes into the hydroisomerization/hydrocracking zone (18) (stage f), the effluent obtained being sent (duct 17) into the separation zone (9).

At the same time, the residual fraction (duct 14) is recycled into the hydroisomerization/hydrocracking zone (8) (Stage d) on the first catalyst.

It has been noted that it is advantageous to recycle part of the kerosene on a hydroisomerization/hydrocracking catalyst in order to improve its cold properties.

In FIGS. 4 and 5, only the recycling of the kerosene has been represented. It goes without saying that part of the diesel oil can just as well be recycled (separately or with the kerosene) and preferably on the same catalyst as the kerosene.

The invention can also be used in other embodiments in order to produce middle distillates.

For example, one embodiment includes the hydrotreatment of an effluent resulting from the Fischer-Tropsch synthesis as a whole, or after separation of the C4 minus fraction (preferably the conversion of the products having boiling points above 370° C. is less than 20%), an optional separation of the C4 minus fraction from the hydrotreatment effluent and at least part of the residual effluent is treated by the process according to the invention (the conversion being preferably at least 40%).

In another embodiment, the effluent resulting from the Fischer-Tropsch synthesis is separated into a heavy fraction (preferably boiling above 260° C.) and at least one light fraction (preferably boiling below 260° C.), the heavy fraction is treated by the process according to the invention, at least one light fraction is hydrotreated then hydrocracked/ isomerized preferably according to the invention.

In another embodiment of the invention, the process can be used for the production of middle distillates, essentially in the absence of oxygenated organic compounds, starting from a synthetic mixture of partially oxygenated hydrocarbons resulting from the Fischer-Tropsch synthesis, substantially linear, containing at least 20% by weight of a fraction having a distillation temperature above 370° C. The process then comprises the following stages:

a) separation of said mixture into at least one fraction boiling at a low temperature (B) (generally with a maximum boiling point ranging from 150 to 380° C., preferably from 260 to 370° C.), richer in oxygenated compounds, and at least one fraction with a high boiling temperature (A) less rich in oxygenated compounds, (generally with a boiling point above 370° C., optionally comprising at least part of a diesel oil-type cut):

b) subjection of said fraction (B) to a hydrogenating treatment under conditions of a nature to avoid any substantial variation in its average molecular weight in order to obtain hydrogenated mixture of essentially non-oxygenated hydrocarbons;

c) recombination of at least part of said hydrogenated mixture according to Stage (b) with said fraction (A) in order to form a mixture (C) of linear hydrocarbons with a reduced content of oxygenated hydrocarbons and subjection of said mixture (C) to a hydrocracking treatment according to the invention in the presence of a hydroisomerization/hydrocracking catalyst, in order to convert at least 40% of said fraction with a high boiling point to a fraction of hydrocarbons which can be distilled at a temperature below 370° C.;

d) separation of at least one fraction of hydrocarbons from the product obtained in Stage (c), the distillation temperature of which is within the range of the middle distillates.

This embodiment will be described with reference to FIG. (6), without this figure limiting the interpretation.

A synthetic flow of substantially linear hydrocarbons, partially oxygenated or essentially free of sulphur, obtained by a Fischer-Tropsch-type process, preferably of the "non-shifting" type, is taken from the synthesis reactor, first subdivided into a fraction boiling at a high boiling point (A), with an initial boiling point ranging from 250° C. to 450° C., and a fraction with a low boiling point (B), with an final boiling point ranging from 200° C. to 450° C. The mass ratio (B)/(A) between the two fractions is preferably comprised between 0.5 and 2.0, more preferably between 0.8 and 1.5 and if necessary, the composition of the two fractions can partially coincide, with a hydrocarbon cut present in both fractions, preferentially in a quantity ranging from 0.1 to 20% by weight with respect to the total weight of each fraction.

The fraction with a low boiling point (B) is fed, by a line 1 into the hydrogenation unit (HDT) in order to carry out Stage (b) of the present embodiment, in which it is brought into contact with hydrogen (line 2) in the presence of a suitable catalyst, under conditions of a nature to minimize or exclude the hydrocracking reaction.

A hydrocarbon fraction produced in the hydrogenation stage having an oxygen content of less than 0.001% by weight (including the gaseous C5-hydrocarbon fraction) is advantageously separated and removed, via the line 5. This fraction does not however represent more than 5%, preferably not more than 3% by weight of the total fraction (B).

A fraction with a low boiling point is thus obtained, essentially constituted by a mixture of saturated hydrocarbons, preferably partially isomerized, which is at least partly, preferably completely, added via the line 4 to the fraction (A) (line 3) of hydrocarbons with a high boiling point with a low oxygen content in order to form a feedstock (C) which feeds a hydrocracking unit (HCK) according to Stage (c) of the present embodiment of the invention.

The following flows are introduced into the hydrocracking unit (HCK):

the feedstock (c), obtained by the addition of the fraction (A) and the fraction resulting from the hydrogenation pretreatment of the fraction (B), via line 4;

the fraction with a high boiling point recycled by line 12, preferably having a boiling point above 360° C., forming the separation residue of the middle distillate, in a mass ratio preferentially comprised between 1 and 40%, more preferably between 5 and 15% with respect to said feedstock (C);

a sufficient quantity of oxygen via the line 6.

Figure 6:
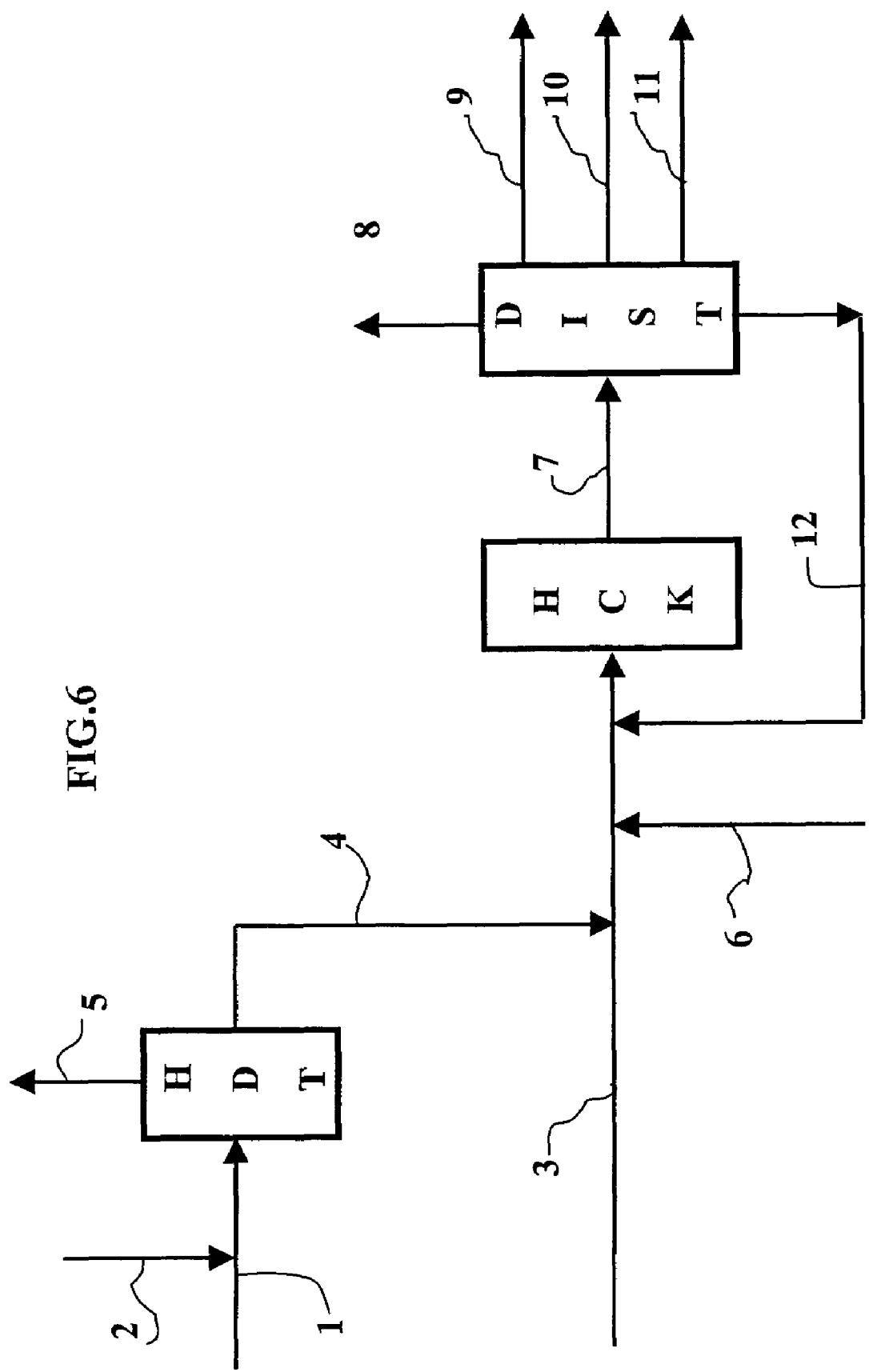
FIG. 6: Schematic diagram of the process according to a sixth embodiment of invention.

The product of the hydrocracking stage, composed of a mixture of hydrocarbons having a degree of isomerization (non-linear hydrocarbons/mass of mixture) preferably greater than 50%, more preferably greater than 70%, is introduced via the line 7 into a stage of separation by distillation (DIST), preferably in a column operating at atmospheric pressure or slightly above, the desired distillates of which are withdrawn via lines 10 (kerosene) and 11 (diesel oil). In FIG. 6, the following products are also obtained in the distillation unit: a C1-C5 gaseous fraction, relatively insignificant, via the line 8, and a fraction of light hydrocarbons, via the line 9, preferably with a boiling point below 150° C. (naphtha) which is formed in Stage (c).

The Products Obtained

The diesel oil(s) obtained has/have a pour point of at most 0° C., generally below −10° C. and often below −15° C. The cetane number is above 60, generally above 65, often below 70.

The kerosene(s) obtained has/have a freezing point of at most −35° C., generally below −40° C. The smoke point is greater than 25 mm, generally greater than 30 mm. In this process, the production of gasoline (not sought) is the lowest possible. The yield of gasoline will always be less than 50% by weight, preferably less than 40% by weight, advantageously less than 30% by weight, or also 20% by weight or even 15% by weight.

EXAMPLE 1

Preparation and Moulding of a Silica-Alumina Which can be used in the Process According to the Invention (SiAl-1)

Aluminium hydroxide powder was prepared according to the process described in the patent WO 00/01617. This powder is mixed with a silica sol prepared by exchange on decationizing resin, then filtered. The composition of the support mixed with anhydrous product is, at this stage, 70% $Al_2O_3$-30% $SiO_2$. The moulding is carried out in the presence of 12% nitric acid with respect to the anhydrous product. The kneading is carried out on a kneader with Z-shaped arms. The extrusion is carried out by passing the paste through a die with orifices 1.4 mm in diameter. The extrudates of SiAl-1 support thus obtained are dried at 150° C. then calcinated at 550° C. then at 750° C. in the present of water vapour.

The characteristics of the support are the following:
The composition of the support is 70% $Al_2O_3$-30% $SiO_2$.
The BET surface is 242 $m_2$/g.
The total pore volume, measured by nitrogen adsorption, is 0.46 ml/g.
The average pore diameter, measured by mercury porosimetry, is 67 Å.
The ratio between the volume V2, measured by mercury porosimetry, comprised between the $D_{average}$−30 Å and the $D_{average}$+30 Å, over the total mercury volume is 0.9.
The volume V3 measured by mercury porosimetry, comprised in the pores with diameters greater than $D_{average}$+30 Å, is 0.023 ml/g.
The volume V6, measured by mercury porosimetry, comprised in the pores with diameters greater than $D_{average}$+15 Å, is 0.029 ml/g.
The ratio between the adsorption surface and the BET surface is 0.83.
The pore volume, measured by mercury porosimetry, comprised in the pores with a diameter greater than 140 Å is 0.013 ml/g.
The pore volume, measured by mercury porosimetry, comprised in the pores with a diameter greater than 160 Å is 0.011 ml/g.
The pore volume, measured by mercury porosimetry, comprised in the pores with a diameter greater than 200 Å is 0.062 ml/g.
The pore volume, measured by mercury porosimetry, comprised in the pores with a diameter greater than 500 Å is 0.001 ml/g.
The X-ray diffraction diagram contains at least the main characteristic gamma lines and it contains the peaks at a d comprised between 1.39 and 1.40 Å, and at a d comprised between 1.97 and 2 Å.
The B/L ratio of the support is 0.12.
The compacted filling density of the catalyst is 1.08 $g/cm^3$.
The atomic sodium content is 200±20 ppm. The atomic sulphur content is 800 ppm.
The MAS NMR spectra of the solid of $^{27}$Al of the catalysts show two multiplets of distinct peaks. A first type of aluminium, the maximum of which resonates towards 10 ppm extends between −100 and 20 ppm. The position of the maximum suggests that these species are essentially of $Al_{VI}$ type (octahedral). A second type of minority aluminium, the maximum of which resonates towards 60 ppm extends between 20 and 100 ppm. This multiplet can be decomposed into at least two species. The predominant species of this multiplet would correspond to the atoms of $Al_{IV}$ type (tetrahedral). The proportion of the octahedral $Al_{VI}$ atoms is 70%.
The catalyst contains two silica-alumina zones, said zones having Si/Al ratios less than or greater than the overall Si/Al ratio determined by X-ray fluorescence. One of the zones has an Si/Al ratio determined by MET of 0.22 and the other zone has an Si/Al ratio determined by MET of 5.8.

EXAMPLE 2

Preparation and Moulding of a Silica-Alumina Which can be used in the Process According to the Invention (SiAl-2)

The silica-alumina SiAl-2 according to the invention is prepared starting with a totally soluble silica-alumina obtained by any technique known to a person skilled in the art, to which a sodium silicate solution is added. The method of operation is as follows: in the first instance, a 30% sulphuric acid solution is added to a sodium silicate solution. The quantity of $H_2SO_4$ is defined in order to work at a fixed neutralization rate. The addition is carried out over two minutes under agitation of 600 rpm. The synthesis temperature is 60° C. The ripening period has been fixed at 30 minutes. Agitation is maintained at 600 rpm, the temperature is that of the previous stage. Then ($Al_2(SO_4)_3$ (500 ml) is added, the concentration is fixed by the desired alumina content. The pH is not regulated and is fixed by the desired alumina content. The addition is carried out over 10 minutes. Agitation is still fixed at 600 rpm, the temperature is the same as that of the previous stages. Then, the ammonium hydroxide is added. The gel obtained is filtered by displacement. Washing is carried out in water at 60° C., 3 kg of water per kg of solid contained in the gel. Then ammonium nitrate $NH_4NO_3$ (138.5 g/l) exchange at 60° C. and 1.5 l per kg of solid contained in the gel is carried out. Finally an additional washing in water at 60° C. is carried out by displacement, 3 kg of water per kg of solid contained in the gel. The gel resulting from this stage is mixed with Pural boehmite powder, in order that the final composition of the support mixed with anhydrous powder is, at this stage of the synthesis, equal to 50% $Al_2O_3$-50% $SiO_2$. Kneading is carried out in a kneader with Z-shaped arms. Extrusion is carried out by passing the paste through a die with orifices 1.4 mm in diameter. The extrudates of silica-alumina (SiAl-2) thus obtained are dried at 150° C., calcinated at 550° C. then at 700° C. in the presence of water vapour.

The characteristics of the support are the following:
The composition of the support is 50.12% $Al_2O_3$-49.88% $SiO_2$.
The BET surface is 254 $m^2$/g.
The total pore volume, measured by nitrogen adsorption, is 0.43 ml/g.
The average pore diameter, measured by mercury porosimetry, is 65 Å.
The ratio between the volume V2, measured by mercury porosimetry, comprised between the $D_{average}$−30 Å and the $D_{average}$+30 Å, over the total mercury volume is 0.91.
The volume V3 measured by mercury porosimetry, comprised in the pores with diameters greater than $D_{average}$+30 Å, is 0.03 ml/g.
The volume V6, measured by mercury porosimetry, comprised in the pores with diameters greater than $D_{average}$+15 Å, is 0.047 ml/g.
The ratio between the adsorption surface and the BET surface is 0.76.
The pore volume, measured by mercury porosimetry, comprised in the pores with a diameter greater than 140 Å is 0.015 ml/g.
The pore volume, measured by mercury porosimetry, comprised in the pores with a diameter greater than 160 Å is 0.013 ml/g.
The pore volume, measured by mercury porosimetry, comprised in the pores with a diameter greater than 200 Å is 0.011 ml/g.
The pore volume, measured by mercury porosimetry, comprised in the pores with a diameter greater than 500 Å is 0.001 ml/g.
The X-ray diffraction diagram contains at least the main lines characteristic of gamma alumina and in particular it contains the peaks at a d comprised between 1.39 and 1.40 Å, and at a d comprised between 1.97 and 2.00 Å.
The B/L ratio of the support is 0.12.
The compacted filling density of the catalyst is 1.05 $g/cm^3$.
The atomic sodium content is 310±20 ppm. The atomic sulphur content is 1600 ppm.
The MAS NMR spectra of the solid of $^{27}$Al of the catalysts show two multiplets of distinct peaks. A first type of aluminium, the maximum of which resonates towards 10 ppm extends between −100 and 20 ppm. The position of the maximum suggests that these species are essentially of $Al_{VI}$ type (octahedral). A second type of minority aluminium, the maximum of which resonates towards 60 ppm extends between 20 and 110 ppm. This multiplet can be decomposed into at least two species. The predominant species of this multiplet would correspond to the atoms of $Al_{IV}$ type (tetrahedral). The proportion of the octahedral $Al_{VI}$ atoms is 67%.

The catalyst contains two silica-alumina zones, said zones having Si/Al ratios less than or greater than the overall Si/Al ratio determined by X-ray fluorescence. One of the zones has an Si/Al ratio determined by MET of 0.25 and the other zone has an Si/Al ratio determined by MET of 5.8.

EXAMPLE 3

Preparation and Moulding of a Silica-Alumina Which can be used in the Process According to the Invention (SiAl-3)

The SiAl-3 support is prepared starting with the SiAl-2 support in dried extruded forms and calcinated by TEOS (tetraethoxysilane) impregnation according to the method described by B. Beguin, E. Garbowski, M. Primet in "Journal of Catalysts", page 595, volume 127, 1991. Then the impregnated extrudates are dried at 120° C. for 15 hours, calcinated at 530° C. under a current of dry air for 2 hours then calcinated at 700° C. in the presence of water vapour.

The sample thus obtained is named SA2.

The extrudates thus obtained are dried at 150° C., then calcinated at 550° C.

The characteristics of the SA2 support are the following:

The composition of the support is 47.7% $Al_2O_3$-52.3% $SiO_2$.

The BET surface is 282 m$^2$/g.

The total pore volume, measured by nitrogen adsorption, is 0.41 ml/g.

The average pore diameter, measured by mercury porosimetry, is 59 Å.

The ratio between the volume V2, measured by mercury porosimetry, comprised between the $D_{average}$−30 Å and the $D_{average}$+30 Å, over the total mercury volume is 0.90.

The volume V3 measured by mercury porosimetry, comprised in the pores with diameters greater than $D_{average}$+30 Å, is 0.035 ml/g.

The volume V6, measured by mercury porosimetry, comprised in the pores with diameters greater than $D_{average}$+15 Å, is 0.04 ml/g.

The ratio between the surface adsorption and the BET surface is 0.75.

The pore volume, measured by mercury porosimetry, comprised in the pores with a diameter greater than 140 Å is 0.011 ml/g.

The pore volume, measured by mercury porosimetry, comprised in the pores with a diameter greater than 160 Å is 0.01 ml/g.

The pore volume, measured by mercury porosimetry, comprised in the pores with a diameter greater than 200 Å is 0.009 ml/g.

The pore volume, measured by mercury porosimetry, comprised in the pores with a diameter greater than 500 Å is 0.001 ml/g.

The X-ray diffraction diagram contains the main lines characteristic of gamma alumina and in particular it contains the peaks at a d comprised between 1.39 and 1.40 Å, and at a d comprised between 1.97 and 2.00 Å.

The B/L ratio of the support is 0.13.

The compacted filling density of the catalyst is 1.07 g/cm$^3$.

The atomic sodium content is 300±20 ppm. The atomic sulphur content is 1500 ppm.

The MAS NMR spectra of the solid of $^{27}$Al of the catalysts show two multiplets of distinct peaks. A first type of aluminium, the maximum of which resonates towards 10 ppm extends between −100 and 20 ppm. The position of the maximum suggests that these species are essentially of $Al_{VI}$ type (octahedral). A second type of minority aluminium, the maximum of which resonates towards 60 ppm extends between 20 and 110 ppm. This multiplet can be decomposed into at least two species. The predominant species of this multiplet would correspond to the atoms of $Al_{IV}$ type (tetrahedral). The proportion of the octahedral $Al_{VI}$ atoms is 67%.

The catalyst contains two silica-alumina zones, said zones having Si/Al ratios less than or greater than the overall Si/Al ratio determined by X-ray fluorescence. One of the zones has an Si/Al ratio determined by MET of 0.25 and the other zone has an Si/Al ratio determined by MET of 6.

EXAMPLE 4

Preparation of Hydrocracking Catalysts Which can be used in the Process According to the Invention (C1, C2, C3)

The catalyst C1 is obtained by dry impregnation of the support SiAl-1 (in the form of extrudates), prepared in Example 1 by a solution of hexachloroplatinic acid $H_2PtCl_6$ dissolved in a volume of solution corresponding to the total pore volume to be impregnated. The impregnated extrudates are then calcinated at 550° C. under air for 4 hours. The platinum content is 0.48% by weight and its dispersion measured by $H_2O_2$ titration is 82% and its distribution is uniform in the extrudates.

The catalyst C2 is obtained by dry impregnation of the support SiAl-2 (in the form of extrudates), prepared in Example 2 by a platinum tetramine dichloride solution $Pt(NH_3)_4Cl_2$ dissolved in a volume of solution corresponding to the total pore volume to be impregnated. The impregnated extrudates are then calcinated at 550° C. under air for 4 hours. The platinum content is 0.57% by weight and its dispersion measured by $H_2O_2$ titration is 62% and its distribution is uniform in the extrudates.

The catalyst C3 is obtained by dry impregnation of the support SiAl-3 (in the form of extrudates), prepared in Example 3 by a solution of hexachloroplatinic acid $H_2PtCl_6$ dissolved in a volume of solution corresponding to the total pore volume to be impregnated. The impregnated extrudates are then calcinated at 550° C. under air for 4 hours. The platinum content is 0.41% by weight and its dispersion measured by $H_2O_2$ titration is 88% and its distribution is uniform in the extrudates.

EXAMPLE 5

Evaluation of the Catalysts C1, C2, C3 in a Process According to the Invention: Hydrocracking of a Paraffinic Feedstock Resulting from Fischer-Tropsch Synthesis The catalysts the preparation of which is described in Example 4 are used to carry out hydrocracking of a paraffinic feedstock resulting from a Fischer-Tropsch unit the main characteristics of which are given below:

| | |
|---|---|
| Density at 20° C. | 0.787 |
| Simulated distillation SD | |
| SD: Initial point | 170 |
| SD: 10% p° C. | 197 |
| SD: 50% p° C. | 350 |
| SD: 90% p° C. | 537 |
| SD: Final point ° C. | 674 |

Content of 370° C.+ fraction (% by weight) 44

The catalysts C1, C2, C3 are used according to the process of the invention by using a pilot unit comprising 1 fixed crossed bed reactor, the fluids circulating from bottom to top (upflow).

Prior to the hydrocracking test, the catalysts are reduced at 120 bar, at 450° C. under pure hydrogen.

After reduction, the catalytic test is carried out under the following conditions:

| | | |
|---|---|---|
| Total pressure | 5.5 MPa | T-356° C. |

Ratio of H2 to feedstock of 1000 normal litres/litre of feedstock

The space velocity (VVH) is equal to 0.9 h-1.

The catalytic performances are expressed by the net conversion into products having a boiling point below 370° C., by the net selectivity in middle distillate cut 150-370° C. and the diesel oil yield/kerosene yield in the middle distillate fraction. They are expressed starting with the simulated distillation results.

The net conversion NC is taken as:

NC 370° C.=[(% of 370° C.$^-_{effluents}$)−[(% of 370° C.$^-_{feedstock}$)]/[100−(% of 370° C.$^-_{feedstock}$)]

with

% of 370° C.$^-_{effluents}$=mass content of compounds having boiling points below 370° C. in the effluents, and % of 370° C.$^-_{feedstock}$=mass content of compounds having boiling points below 370° C. in the feedstock, The diesel oil yield/kerosene yield (Do/Ker ratio) in the middle distillate fraction is taken as equal to:

Do/Ker ratio=yield of the fraction (250° C.-370° C.) of the effluent/yield of the fraction (150° C.-250° C.) in the effluent.

The catalytic performances obtained are given in Tables 1 and 2 below.

The net conversions to products having a boiling point below 370° C., as defined previously, are, under the operating conditions described above, provided for the catalysts C1, C2 and C3 in Table 1.

TABLE 2

| Net conversions into 370° C.-. | | | |
|---|---|---|---|
| | C1 | C2 | C3 |
| CN 370° C. (% by weight) | 74.8 | 71.4 | 74.2 |

TABLE 2

| | Yield of products formed: | | | | |
|---|---|---|---|---|---|
| Cuts | Yield (% by weight) $C_1$-$C_4$ | Yield (% by weight) $C_5$-150° C. | Yield (% by weight) 150-370° C. | Yield (% by weight) 370° C.+ | Do/Ker ratio |
| C1 | 1.2 | 10.2 | 77.8 | 11.1 | 2.05 |
| C2 | 1.0 | 9.9 | 76.7 | 12.7 | 2.10 |
| C3 | 1.3 | 10.5 | 77.1 | 11.5 | 2.06 |

TABLE 3

| | Main properties of products formed: | |
|---|---|---|
| Cuts | 150-250° C. Kerosene cut | 250-370° C. Diesel oil cut |
| Catalyst C1 | Smoke point >50 mm Freezing point −48° C. | Cetane >70 Pour point −18° C. |
| Catalyst C2 | Smoke point >50 mm Freezing point −42° C. | Cetane >70 Pour point −15° C. |
| Catalyst C3 | Smoke point >50 mm Freezing point −48° C. | Cetane >70 Pour point −20° C. |

These results show (Tables 1 and 2) that the use of the process according to the invention makes it possible, by hydrocracking of a paraffinic feedstock resulting from the Fischer-Tropsch synthesis process, to obtain very good middle distillate yields, cuts 150-250 (kerosene) and 250-370° C. (diesel oil). Moreover, these products have excellent properties and in particular excellent cold properties as indicated by Table 3.

The invention claimed is:

1. Process for preparing middle distillates from a paraffinic feedstock produced by Fischer-Tropsch synthesis, using a hydrocracking/hydroisomerization catalyst which comprises:
   at least one hydro-dehydrogenating element chosen from the group formed by the noble elements of Group VIII of the periodic table.
   a non-zeolitic silica-alumina-based support containing a quantity greater than 5% by weight and lower than or equal to 95% by weight of silica ($SiO_2$).
   an average pore diameter, measured by mercury porosimetry, comprised between 20 and 140 Å,
   a total pore volume, measured by mercury porosimetry, comprised between 0.1 ml/g and 0.6 ml/g,
   a total pore volume, measured by nitrogen porosimetry comprised between 0.1 ml/g and 0.6 ml/g,
   a BET specific surface comprised between 100 and 550 m$^2$/g,
   a pore volume measured by mercury porosimetry, comprised in the pores with a diameter larger than 140 Å, smaller than 0.1 ml/g,
   a pore volume, measured by mercury porosimetry, comprised in the pores with a diameter larger than 160 Å, smaller than 0.1 ml/g,
   a pore volume, measured by mercury porosimetry, comprised in the pores with a diameter larger than 200 Å, smaller than 0.1 ml/g,
   a pore volume, measured by mercury porosimetry, comprised in the pores with a diameter larger than 500 Å, smaller than 0.01 ml/g,
   an X-ray diffraction diagram which contains at least the main lines characteristic of at least one of the transition aluminas comprised in the group made up of the alpha, rho, chi, eta, gamma, kappa, theta and delta aluminas, wherein the non-zeolitic based support was obtained from a process compromising starting from a mixture of a partially soluble alumina compound in an acid medium with a totally soluble silica compound or with a totally soluble combination to alumina and hydrated silica, the resultant mixture is concentrated to form a moldable mixture, the resultant moldable mixture is molded and the resultant molded article is subjected to a hydrothermal or thermal treatment.

2. A process according to claim 1 wherein in the catalyst the proportion of the octahedral $Al_{VI}$ atoms determined by analysis of the MAS NMR spectra of the $^{27}Al$ solid is greater than 50%.

3. A process according to claim 1 wherein the catalyst comprises at least one doping element chosen from the group formed by phosphorus, boron and silicon and deposited on the catalyst.

4. A process according to claim 1 in which the catalyst has a cationic impurities content of less than 0.1% by weight.

5. A process according to claim 1 in which the catalyst has an anionic impurities content of less than 0.5% by weight.

6. A process according to claim 1 wherein an X-ray diffraction diagram of the non-zeolitic silica-alumina support contains at least the main lines characteristic of at least one of the transition aluminas comprised in the group made up of the eta, theta, delta and gamma aluminas.

7. A process according to claim 1 using wherein an X-ray diffraction diagram of the non-zeolitic silica alumina support contains at least the main lines characteristic of at least one of the transition aluminas comprised in the group made up of the eta and gamma aluminas.

8. A process according to claim 1 using a catalyst such that:
the ratio between the volume V2, measured by mercury porosimetry, comprised between the $D_{average}$–30 Å and the $D_{average}$+30 Å, over the total mercury volume is 0.6.
the volume V3, measured by mercury porosimetry, comprised in the pores with diameters greater than $D_{average}$+ 30 Å, is less than 0.1 ml/g.
the volume V6, measured by mercury porosimetry, comprised in the pores with diameters greater than $D_{average}$+ 15 Å, is less than 0.2 ml/g.

9. A process according to claim 1, such that the average pore diameter of the catalyst is comprised between 40 and 120 Å.

10. A process according to claim 1, such that the compacted filling density of the catalyst is greater than 0.85 g/cm$^3$.

11. A process according to claim 1, such that the acidity of the catalyst support measured by IR monitoring of the thermo-desorption of the pyridine is such that the B/L ratio (ratio of the number of Bronsted sites/number of Lewis sites) is comprised between 0.05 and 1.

12. Process for producing middle distillates from a paraffinic feedstock produced by Fischer-Tropsch synthesis comprising the following successive stages: separation of a single "heavy" fraction with an initial boiling point comprised between 120 and 200° C.
a) hydrotreatment of at least part of said heavy fraction,
b) fractionation into at least three fractions: at least one intermediate fraction having an initial boiling point T1 comprised between 120 and 200° C., and a final boiling point T2 greater than 300° C. and less than 410° C., at least one light fraction boiling below the intermediate fraction, at least one heavy fraction boiling above the intermediate fraction,
c) passage of at least part of said intermediate fraction into a process according to claim 1 on a hydroisomerization/hydrocracking non-zeolitic catalyst,
d) passage into a process according to claim 1 on a hydroisomerization/hydrocracking non-zeolitic catalyst, of at least part of said heavy fraction,
e) distillation of the hydrocracked/hydroisomerized fractions in order to obtain middle distillates, and recycling of the residual fraction boiling above said middle distillates into Stage (e) on the catalyst treating the heavy fraction.

13. A process for producing middle distillates from a paraffinic feedstock produced by Fischer-Tropsch synthesis comprising the following successive stages:
a) separation of at least one light fraction from the feedstock in order to obtain a single "heavy" fraction with an initial boiling point comprised between 120 and 200° C.
b) optional hydrotreatment of said heavy fraction, optionally followed by a stage
c) of removal of at least part of the water,
d) passage into a process according to claim 1 of at least part of said fraction optionally hydrotreated, the conversion on the hydroisomerization/hydrocracking catalyst of the products with boiling points above or equal to 370° C., into products with boiling points below 370° C. is greater than 80% by weight.
e) distillation of the hydrocracked/hydroisomerized fraction in order to obtain middle distillates, and recycling into Stage (d) of the residual fraction boiling above said middle distillates.

14. A process for producing middle distillates from a paraffinic feedstock produced by Fischer-Tropsch synthesis comprising the following successive stages:
a) Fractionation (Stage a) of the feedstock into at least 3 fractions:
at least one intermediate fraction having an initial boiling point T1 comprised between 120 and 200° C., and a final boiling point T2 greater than 300° C. and less than 410° C.,
at least one light fraction boiling below the intermediate fraction,
at least one heavy fraction boiling above the intermediate fraction,
b) Hydrotreatment (Stage b) of at least part of said intermediate fraction, then passage (Stage d) into a process of treatment of at least part of the hydrotreated fraction on a hydroisomerization/hydrocracking catalyst,
f) Passage (Stage f) into a process of treatment of at least part of said heavy fraction on a hydroisomerization/hydrocracking catalyst, with conversion of the products with boiling points above or equal to 370° C., to products with boiling points below 370° C., greater than 80% by weight.
e and g) Distillation (Stages e and g) of at least part of the hydrocracked/hydroisomerized fractions in order to obtain middle distillates, and at least one of said treatment processes is the process according to claim 1.

15. A process for producing middle distillates from a paraffinic feedstock produced by Fischer-Tropsch synthesis comprising the following successive stages:
a) optional fractionation of the feedstock into at least one heavy fraction with an initial boiling point comprised between 120 and 200° C., and at least one light fraction boiling below said heavy fraction,
b) optional hydrotreatment of at least part of the feedstock or the heavy fraction, optionally followed by a Stage c)
c) elimination of at least part of the water, d) passage of at least part of the optionally hydrotreated effluent or fraction into a treatment process on a first hydroisomerization/hydrocracking catalyst containing at least one noble metal of Group VIII, e) distillation of the hydroisomerized/hydrocracked effluent in order to obtain middle distillates (kerosene, diesel oil) and a residual fraction boiling above the middle distillates, f) on a second hydroisomerization/hydrocracking catalyst containing at least one noble metal of Group VIII, passage into a treatment process of at least part of said residual heavy fraction and/or part of said middle distillates and distillation of the resultant effluent in order to obtain middle distillates, and at least one of said treatment processes is the process according to claim 1.

16. A process for producing middle distillates from a paraffinic feedstock produced by Fischer-Tropsch synthesis comprising the following successive stages:

a) separation of the feedstock into at least one fraction with a low boiling temperature (B) richer in oxygenated compounds, and at least one fraction with a high boiling temperature (A) less rich in oxygenated compounds;

b) subjection of said fraction (B) to a hydrogenating treatment under conditions so as to avoid any substantial variation in its average molecular weight in order to obtain hydrogenated mixture of substantially non-oxygenated hydrocarbons;

c) recombination of at least part of said hydrogenated mixture according to Stage (b) with said fraction (A) in order to form a mixture (C) of linear hydrocarbons with a reduced content of oxygenated hydrocarbons and subjection of said mixture (C) to a hydrocracking treatment in the presence of a hydroisomerization/hydrocracking catalyst, in order to convert at least 40% of said fraction with a high boiling point to a fraction of hydrocarbons which can be distilled at a temperature below 370° C.;

d) separation of at least one fraction of hydrocarbons from the product obtained in Stage (c), the distillation temperature of which is within the range of the middle distillates; process in which the hydrocracking process of Stage c) is the process according to claim 1.

17. A process according to claim 1, in which the hydrocracking/hydroisomerization catalyst is based on platinum/palladium.

18. Process according to claim 1, in which the hydrocracking/hydroisomerization catalyst contains from 0.05 to 10% of noble metal of Group VIII.

19. A process according to claim 8, wherein the silica content of the silica-alumina-based, non-zeolitic support is between 10 and 50% by weight, the average pore diameter is 50-100 Å, the pore volume measured by mercury porosimetry, comprised in the pores with a diameter larger than 140 Å is less than 0.03 ml/g, the pore volume measured by mercury porosimetry, comprised in the pores with a diameter larger than 160 Å is less than 0.025 ml/g, a pore volume measured by mercury porosimetry, comprised in the pores with a diameter larger than 200 Å is less than 0.025 ml/g.

20. A process according to claim 1, wherein the at least one hydro-dehydrogenating element is platinum.

21. A process according to claim 20, wherein the non-zeolitic silica-alumina based support was obtained from a process comprising starting from a mixture of a partially soluble alumina compound in an acid medium with a totally soluble silica compound the resultant mixture is concentrated to form a moldable mixture, the resultant moldable mixture is molded and the resultant molded article is subjected to a hydrothermal or thermal treatment.

22. A process according to claim 20, wherein the non-zeolitic silica-alumina based support was obtained from a process comprising starting from a mixture of a totally soluble combination of alumina and hydrated silica, the resultant mixture is concentrated to form a moldable mixture, the resultant moldable mixture is molded and the resultant molded article is subjected to a hydrothermal or thermal treatment.

23. A process according to claim 1, wherein the silica-alumina has the following characteristics:

a composition of 70% $Al_2O_3$-30% $SiO_2$:

a BET surface of 242 $m^2$/g, a total pore volume, measured by nitrogen adsorption, of 0.46 ml/g, an average pore diameter, measured by mercury porosimetry, of 67 Å, a ratio between the volume V2, measured by mercury porosimetry, comprised between the $D_{average}$+30 Å and the $D_{average}$+30 Å, over the total mercury volume of 0.9, a volume V3 measured by mercury porosimetry, comprised in the pores with diameters greater than $D_{average}$+30 Å, of 0.023 ml/g, a volume V6, measured by mercury porosimetry, comprised in the pores with diameters greater than $D_{average}$+15 Å, of 0.029 ml/g, a ratio between the adsorption surface and the BET surface of 0.83, a pore volume, measured by mercury porosimetry, comprised in the pores with a diameter greater than 140 Å of 0.013 ml/g, a pore volume, measured by mercury porosimetry, comprised in the pores with a diameter greater than 160 Å of 0.011 ml/g, a pore volume, measured by mercury porosimetry, comprised in the pores with a diameter greater than 200 Å of 0.062 ml/g, a pore volume, measured by mercury porosimetry, comprised in the pores with a diameter greater than 500 Å of 0.001 ml/g, a corresponding X-ray diffraction diagram containing at least the main characteristic gamma lines and containing the peaks at a d comprised between 1.39 and 1.40 Å, and at a d comprised between 1.97 and 2 Å, a B/L ratio of 0.12, a compacted filling density of the catalyst of 1.08 g/cm$^3$, an atomic sodium content of 200 +/−20 ppm, an atomic sulphur content of 800 ppm, a corresponding MAS NMR spectra of the solid of $_{27}$Al of the catalysts having two multiplets of distinct peaks, a first type of aluminium, the maximum of which resonates towards 10 ppm extends between −100 and 20 ppm, whereby it is essentially of $Al_{VI}$ type (octahedral), and a second type of minority aluminium, the maximum of which resonates towards 60 ppm extends between 20 and 100 ppm, wherein this multiplet can be decomposed into at least two species, the predominant species of this multiplet coffesponding to the atoms of $Al_{VI}$ type (tetrahedral), and wherein the proportion of the octahedral $Al_{VI}$ atoms is 70%, and wherein the catalyst contains two silica-alumina zones, said zones have Si/Al ratios less than or greater than the overall Si/Al ratio determined by X-ray fluorescence, and one of the zones has an Si/Al ratio determined by MET of 0.22 and the other zone has an Si/Al ratio determined by MET of 5.8.

24. A process according to claim 1, wherein the silica-alumina has the following characteristics:
a composition of 50.12% $Al_2O_3$-49.88% $SiO_2$,
a BET surface of 254 $m^2/g$,
a total pore volume, measured by nitrogen adsorption, of 0.43 ml/g,
an average pore diameter, measured by mercury porosimetry, of 65 Å,
a ratio between the volume V2, measured by mercury porosimetry, comprised between the $D_{average}$−30 Å and the $D_{average}$+30 Å, over the total mercury volume of 0.91,
a volume V3 measured by mercury porosimetry, comprised in the pores with diameters greater than $D_{average}$+30 Å, of 0.03 ml/g,
a volume V6, measured by mercury porosimetry, comprised in the pores with diameters greater than $D_{average}$+15 Å, of 0.047 ml/g,
a ratio between the adsorption surface and the BET surface of 0.76,
a pore volume, measured by mercury porosimetry, comprised in the pores with a diameter greater than 140 Å of 0.015 ml/g,
a pore volume, measured by mercury porosimetry, comprised in the pores with a diameter greater than 160 Å of 0.013 ml/g,
a pore volume, measured by mercury porosimetry, comprised in the pores with a diameter greater than 200 Å of 0.011 ml/g,
a pore volume, measured by mercury porosimetry, comprised in the pores with a diameter greater than 500 Å of 0.001 ml/g,
a corresponding X-ray diffraction diagram containing at least the main lines characteristic of gamma alumina and the peaks at a d comprised between 1.39 and 1.40 Å, and at a d comprised between 1.97 and 2.00 Å,
a B/L ratio of 0.12,
a compacted filling density of the catalyst of 1.05 $g/cm^3$,
an atomic sodium content of 310 +/−20 ppm,
an atomic sulphur content of 1600 ppm,
a corresponding MAS NMR spectra of the solid of $^{27}Al$ of the catalysts having two multiplets of distinct peaks, a first type of aluminium, the maximum of which resonates towards 10 ppm extends between −100 and 20 ppm, whereby it is essentially of $Al_{VI}$ type (octahedral), and a second type of minority aluminium, the maximum of which resonates towards 60 ppm extends between 20 and 110 ppm, wherein this multiplet can be decomposed into at least two species, the predominant species of this multiplet cofresponding to the atoms of $Al_{IV}$ type (tetrahedral), and
wherein the proportion of the octahedral $Al_{VI}$ atoms is 67%,
and wherein the catalyst contains two silica-alumina zones, said zones having Si/Al ratios less than or greater than the overall Si/Al ratio determined by X-ray fluorescence, and one of the zones has an Si/Al ratio determined by MET of 0.25 and the other zone has an Si/Al ratio determined by MET of 5.8.

25. A process according to claim 1, wherein the silica-alumina has the following characteristics:
a composition of 47.7% $Al_2O_3$-52.3% $SiO_2$,
a BET surface of 282 $m^2/g$,
a total pore volume, measured by nitrogen adsorption, of 0.41 ml/g,
an average pore diameter, measured by mercury porosimetry, of 59 Å,
a ratio between the volume V2, measured by mercury porosimetry, comprised between the $D_{average}$−30 Å and the $D_{average}$+30 Å, over the total mercury volume of 0.90,
a volume V3 measured by mercury porosimetry, comprised in the pores with diameters greater than $D_{average}$+30 Å, of 0.035 ml/g,
a volume V6, measured by mercury porosimetry, comprised in the pores with diameters greater than $D_{average}$+15 Å, of 0.04 ml/g,
a ratio between the surface adsorption and the BET surface of 0.75,
a pore volume, measured by mercury porosimetry, comprised in the pores with a diameter greater than 140 Å of 0.011 ml/g,
a pore volume, measured by mercury porosimetry, comprised in the pores with a diameter greater than 160 Å of 0.01 ml/g,
a pore volume, measured by mercury porosimetry, comprised in the pores with a diameter greater than 200 Å of 0.009 ml/g,
a pore volume, measured by mercury porosimetry, comprised in the pores with a diameter greater than 500 Å of 0.001 ml/g,
a corresponding X-ray diffraction diagram containing the main lines characteristic of gamma alumina and the peaks at a d comprised between 1.39 and 1.40 Å, and at a d comprised between 1.97 and 2.00 Å,
a B/L ratio of 0.13,
a compacted filling density of the catalyst of 1.07 $g/cm^3$,
an atomic sodium content of 300+/−20 ppm,
an atomic sulphur content of 1500 ppm,
a corresponding MAS NMR spectra of the solid of $^{27}Al$ of the catalysts having two multiplets of distinct peaks, a first type of aluminium, the maximum of which resonates towards 10 ppm extends between −100 and 20 ppm, whereby it is essentially of $^{27}Al_{VI}$ type (octahedral), and a second type of minority aluminium, the maximum of which resonates towards 60 ppm extends between 20 and 110 ppm, wherein this multiplet can be decomposed into at least two species, the predominant species of this multiplet coffesponding to the atoms of $Al_{IV}$ type (tetrahedral), and
wherein the proportion of the octahedral $Al_{VI}$ atoms is 67%,
and wherein the catalyst contains two silica-alumina zones, said zones having Si/Al ratios less than or greater than the overall Si/Al ratio determined by X-ray fluorescence, and one of the zones has an Si/Al ratio determined by MET of 0.25 and the other zone has an Si/Al ratio determined by MET of 6.

* * * * *

UNITED STATES PATENT AND TRADEMARK OFFICE
CERTIFICATE OF CORRECTION

PATENT NO. : 7,704,378 B2  
APPLICATION NO. : 10/543494  
DATED : April 27, 2010  
INVENTOR(S) : Benazzi et al.

It is certified that error appears in the above-identified patent and that said Letters Patent is hereby corrected as shown below:

Column 42, line 36 reads "Process for preparing middle distillates from a paraffinic" should read -- A process for preparing middle distillates from a paraffinic --

Column 42, line 37 reads "feedstock produced by Fischer-Tropsch synthesis, using a" should read -- feedstock produced by Fischer-Tropsch synthesis, said process comprising contacting said paraffinic feedstock with a --

Column 43, line 3 reads "wherein the non-zeolitic based support was obtained from" should read -- wherein the non-zeolitic silica-alumina based support was obtained from --

Column 43, line 4 reads "a process compromising starting from a mixture of a" should read -- a process comprising starting from a mixture of a --

Column 43, line 29 reads "7. A process according to claim 1 using wherein an X-ray" should read -- 7. A process according to claim 1 wherein an X-ray --

Column 43, line 55 reads "12. Process for producing middle distillates from paraf-" should read -- 12. A process for producing middle distillates from paraf- --

Column 45, line 23 reads "b) subjection of said fraction (B) to a hydrogenating treat" should read -- b) subjection said fraction (B) to a hydrogenating treat --

Column 45, line 26 reads "obtain hydrogenated mixture of substantially non-oxy-" should read -- obtain a hydrogenated mixture of substantially non-oxy- --

Column 45, line 32 reads "jection of said mixture (C) to a hydrocracking treatment" should read -- jection said mixture (C) to a hydrocracking treatment --

Signed and Sealed this

Thirtieth Day of November, 2010

David J. Kappos  
*Director of the United States Patent and Trademark Office*

CERTIFICATE OF CORRECTION (continued)
U.S. Pat. No. 7,704,378 B2

Column 46, line 14 reads "a composition of 70%Al$_2$O$_3$-30% SiO$_2$:" should read -- a composition of 70%Al$_2$O$_3$-30% SiO$_2$, --

Column 46, line 51 reads "a corresponding MAS NMR spectra of the solid of $_{27}$Al of" should read -- a corresponding MAS NMR spectra of the solid of $^{27}$Al of --

Column 46, line 60 reads "predominant species of this multiple coffesponding to the" should read -- predominant species of this multiple corresponding to the --

Column 46, line 61 reads "atoms of Al$_{VI}$ type (tetrahedral), and" should read -- atoms of Al$_{IV}$ *type (tetrahedral, and* --

Column 47, line 51 reads "multiplet coffesponding to the atoms of Al$_{IV}$ type(tetra-" should read -- multiplet corresponding to the atoms of Al$_{IV}$ type(tetra- --

Column 48, line 45 reads "ppm, whereby it is essentially of $^{27}$Al$_{VI}$ *type (octahe-*" should read -- ppm, whereby it is essentially of Al$_{VI}$ *type (octahe-* --

Column 48, line 50 reads "species of this multiplet coffesponding to the atoms of" should read -- species of this multiplet corresponding to the atoms of --